United States Patent
Van Lieshout et al.

(10) Patent No.: US 10,433,232 B2
(45) Date of Patent: Oct. 1, 2019

(54) INTERNET PROTOCOL ADDRESS PRESERVATION IN MOBILE OPERATOR NETWORKS

(71) Applicant: Samsung Electronics Co., Ltd., Suwon-si, Gyeonggi-do (KR)

(72) Inventors: Gert Jan Van Lieshout, Staines (GB); Howard Peter Benn, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/576,118

(22) PCT Filed: May 3, 2016

(86) PCT No.: PCT/KR2016/004652
§ 371 (c)(1),
(2) Date: Nov. 21, 2017

(87) PCT Pub. No.: WO2016/186348
PCT Pub. Date: Nov. 24, 2016

(65) Prior Publication Data
US 2018/0152877 A1    May 31, 2018

(30) Foreign Application Priority Data
May 21, 2015  (GB) .................... 1508734.9

(51) Int. Cl.
*H04W 40/02*  (2009.01)
*H04W 40/36*  (2009.01)
(Continued)

(52) U.S. Cl.
CPC ............. *H04W 40/02* (2013.01); *H04L 45/02* (2013.01); *H04L 45/74* (2013.01);
(Continued)

(58) Field of Classification Search
CPC ... H04W 40/02; H04W 40/248; H04W 40/36; H04W 88/16; H04L 45/74; H04L 45/02; H04L 61/2007
See application file for complete search history.

(56) References Cited

U.S. PATENT DOCUMENTS

2012/0188983 A1* 7/2012 Mihaly ................. H04W 36/12
370/331
2012/0207129 A1  8/2012 Sun
(Continued)

FOREIGN PATENT DOCUMENTS

JP    2012-095234 A    5/2012
KR    10-2012-0131045 A    12/2012
(Continued)

*Primary Examiner* — Mohammad S Anwar
(74) *Attorney, Agent, or Firm* — Jefferson IP Law, LLP

(57) ABSTRACT

A method of operating a mobile communications network arranged to communicate data packets between a mobile terminal and a packet data network via one or more routers, wherein the one or more routers include routing information for routing data packets, the method comprising establishing a data packet pathway for communicating data packets between a first Internet Protocol, IP, address associated with the mobile terminal and a second IP address associated with the packet data network, the data packet pathway including a first local gateway, wherein a local gateway is a first point within the mobile communications network through which all data packets communicated over the data packet pathway from the second IP address to the first IP address must pass; communicating one or more data packets between the first and second IP addresses via the data packet pathway; selecting a second local gateway; updating the routing information of at least one of the routers such that the second local gateway replaces the first local gateway in the data (Continued)

packet pathway; and communicating one or more data packets between the first and second IP addresses via the data packet pathway.

13 Claims, 16 Drawing Sheets

(51) Int. Cl.
*H04L 12/751* (2013.01)
*H04L 12/741* (2013.01)
*H04L 29/12* (2006.01)
*H04W 40/24* (2009.01)
*H04W 36/00* (2009.01)
*H04W 88/08* (2009.01)
*H04W 88/16* (2009.01)

(52) U.S. Cl.
CPC ....... *H04L 61/2007* (2013.01); *H04W 40/248* (2013.01); *H04W 40/36* (2013.01); *H04W 36/0033* (2013.01); *H04W 88/08* (2013.01); *H04W 88/16* (2013.01)

(56) References Cited

U.S. PATENT DOCUMENTS

| | | |
|---|---|---|
| 2013/0003697 A1 | 1/2013 | Adjakple et al. |
| 2014/0254373 A1 | 9/2014 | Varma |
| 2015/0016340 A1 | 1/2015 | Itoh et al. |
| 2016/0150448 A1 | 5/2016 | Perras et al. |

FOREIGN PATENT DOCUMENTS

| | | |
|---|---|---|
| KR | 10-2014-0045522 A | 4/2014 |
| WO | 2011/025421 A1 | 3/2011 |
| WO | 2013/128513 A1 | 9/2013 |
| WO | 2015/009939 A1 | 1/2015 |

* cited by examiner

[Fig. 1]
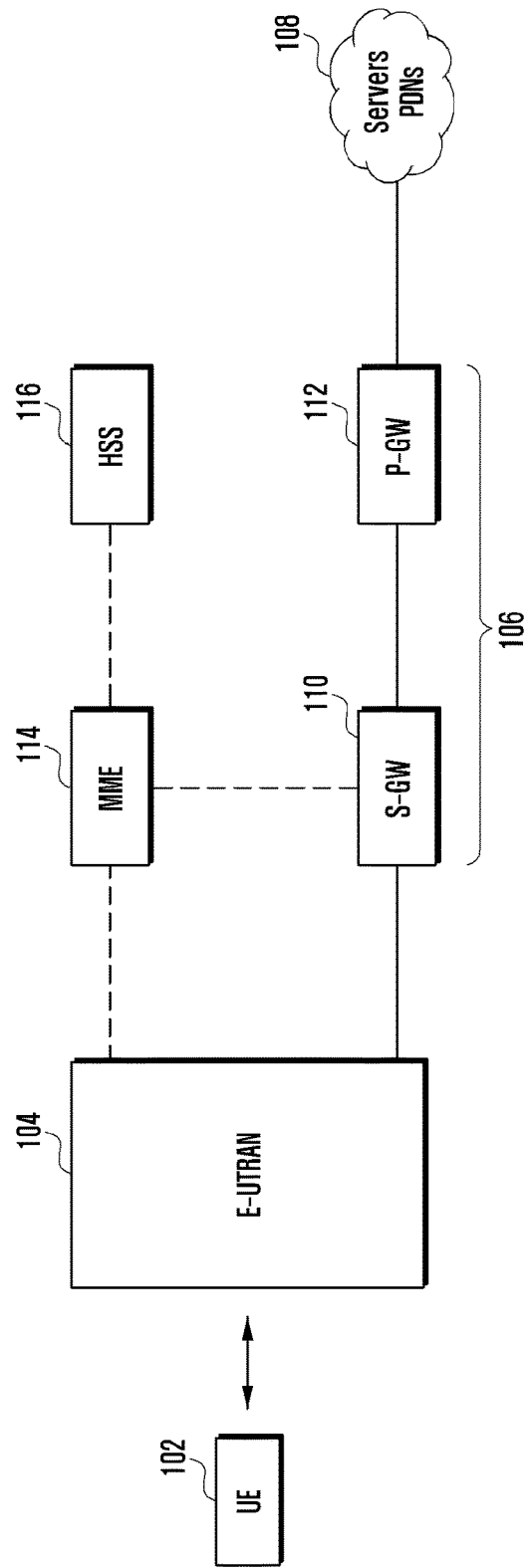

[Fig. 2]
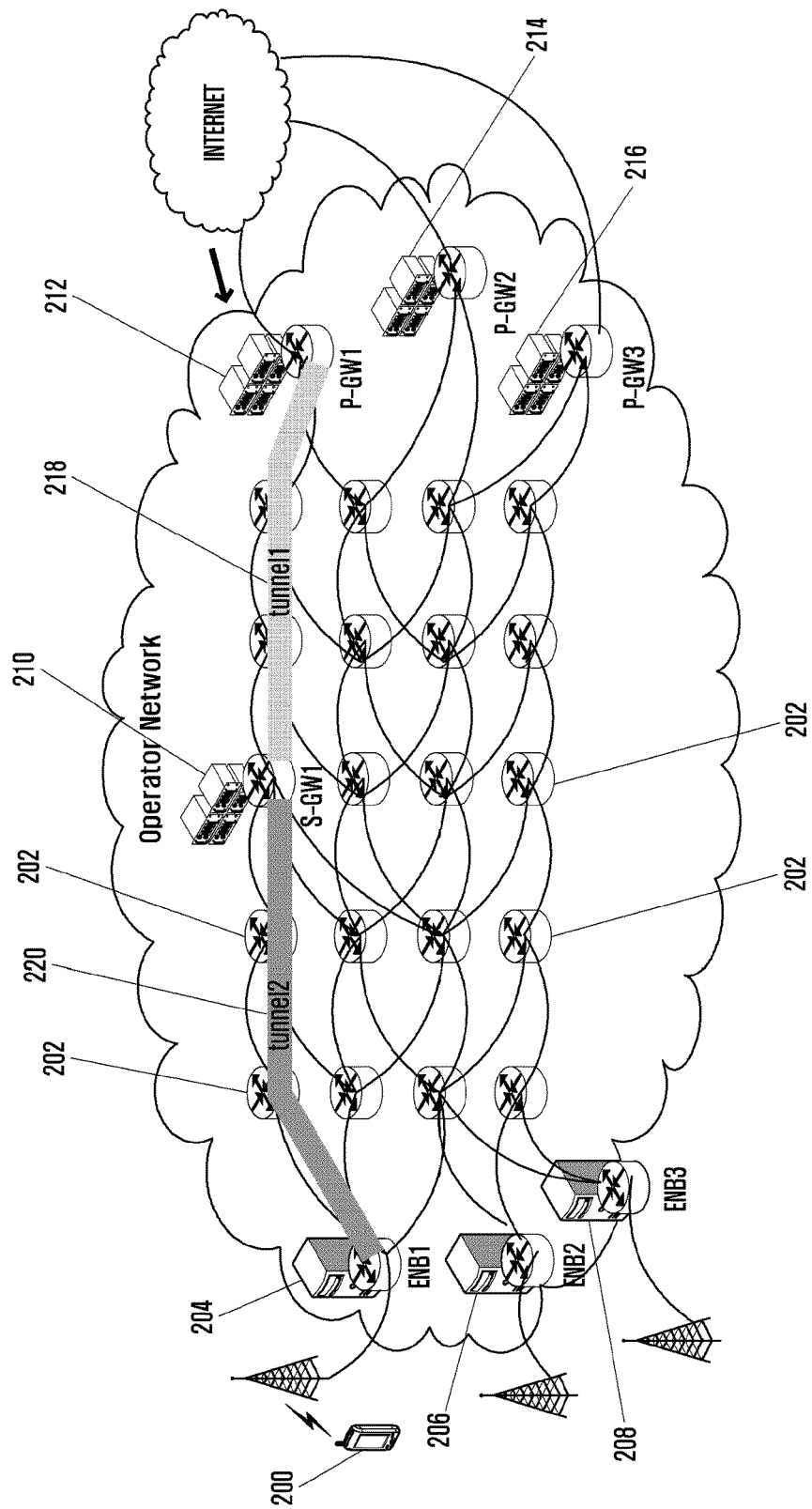

[Fig. 3]
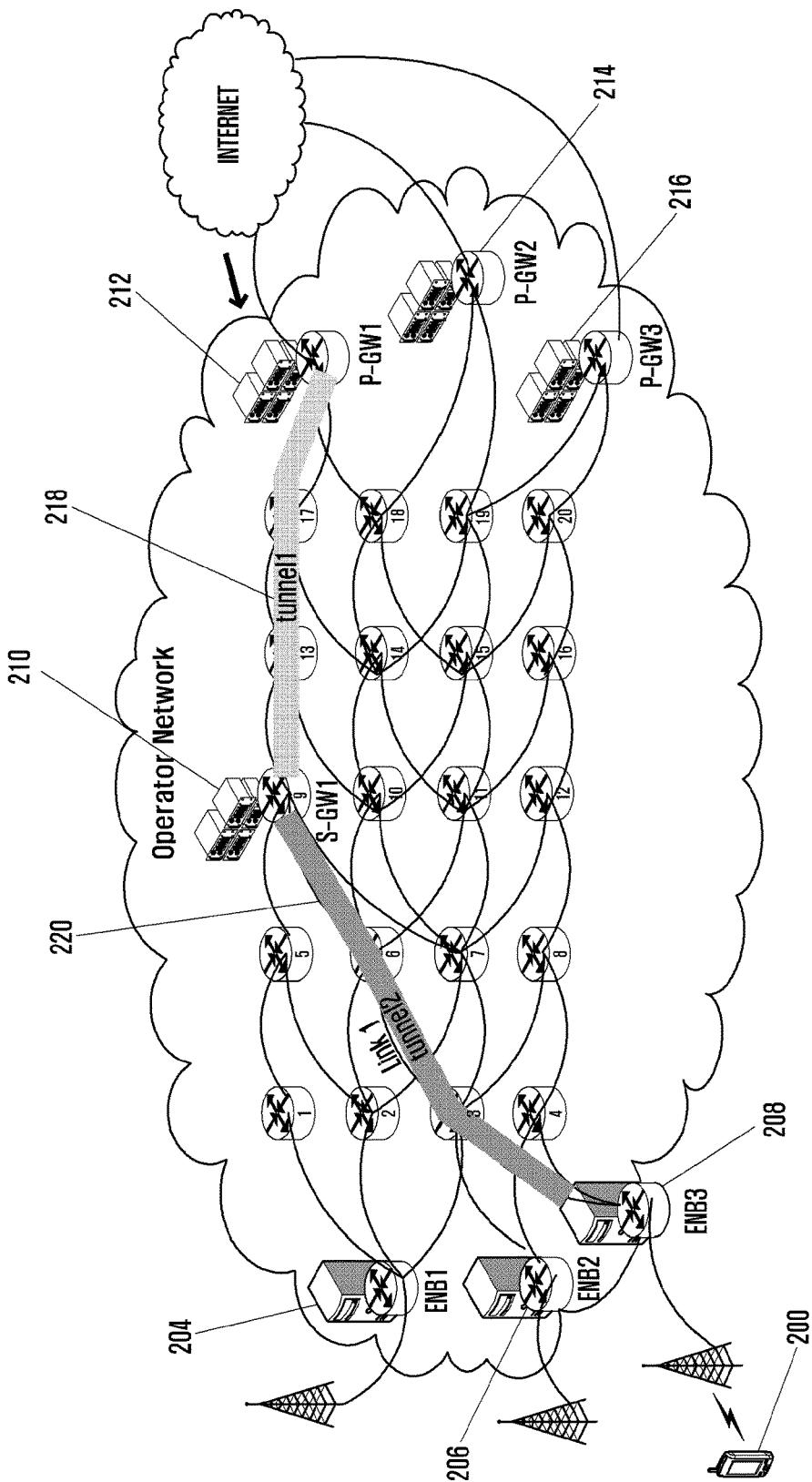

[Fig. 4]
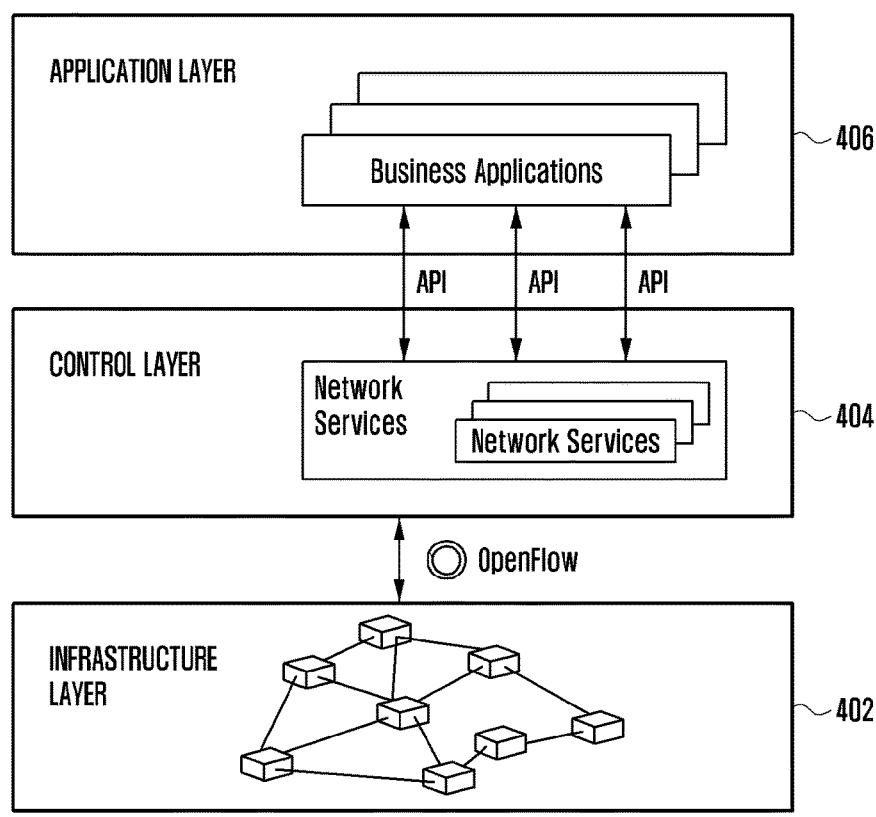

[Fig. 5]
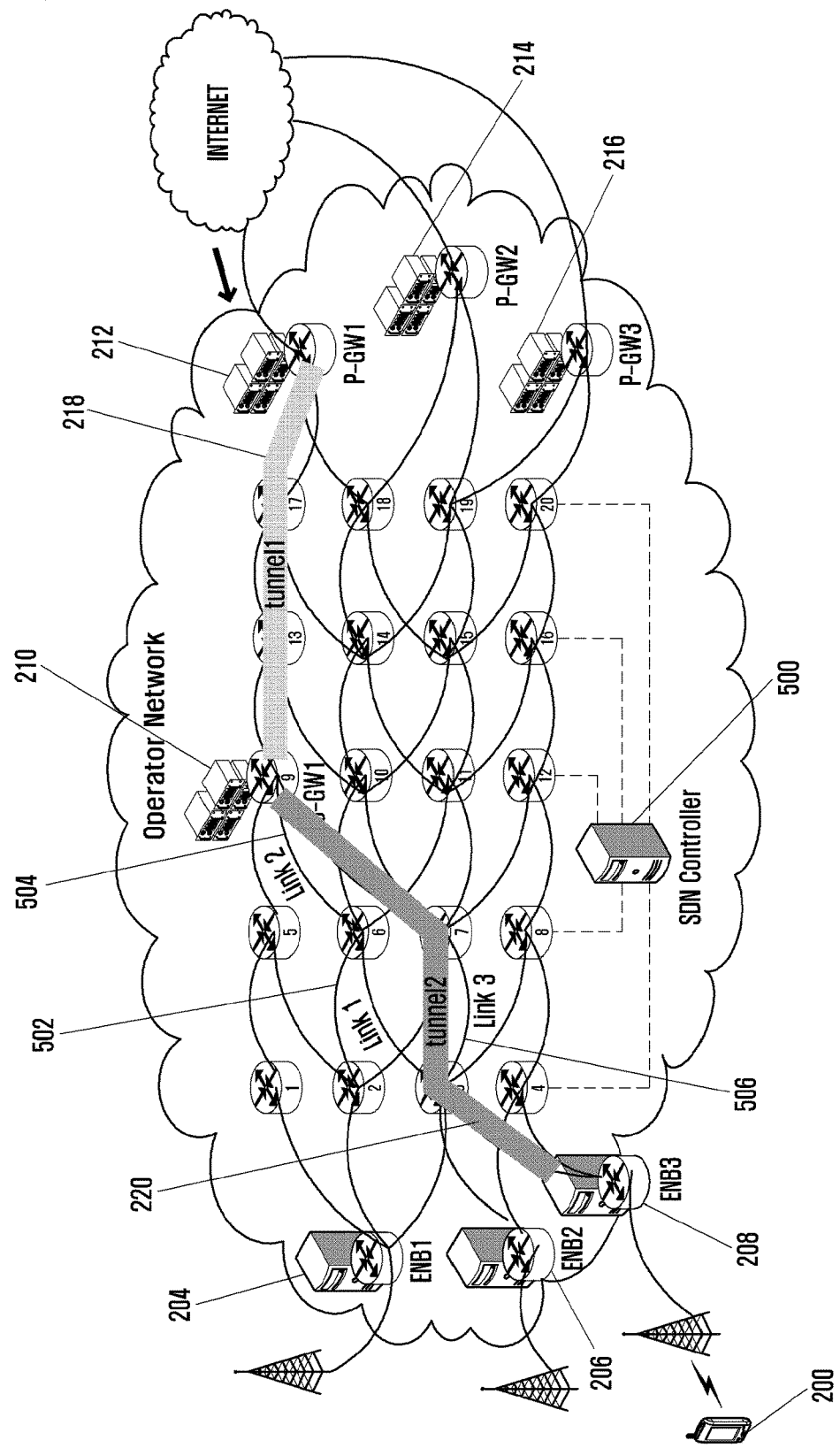

[Fig. 6]
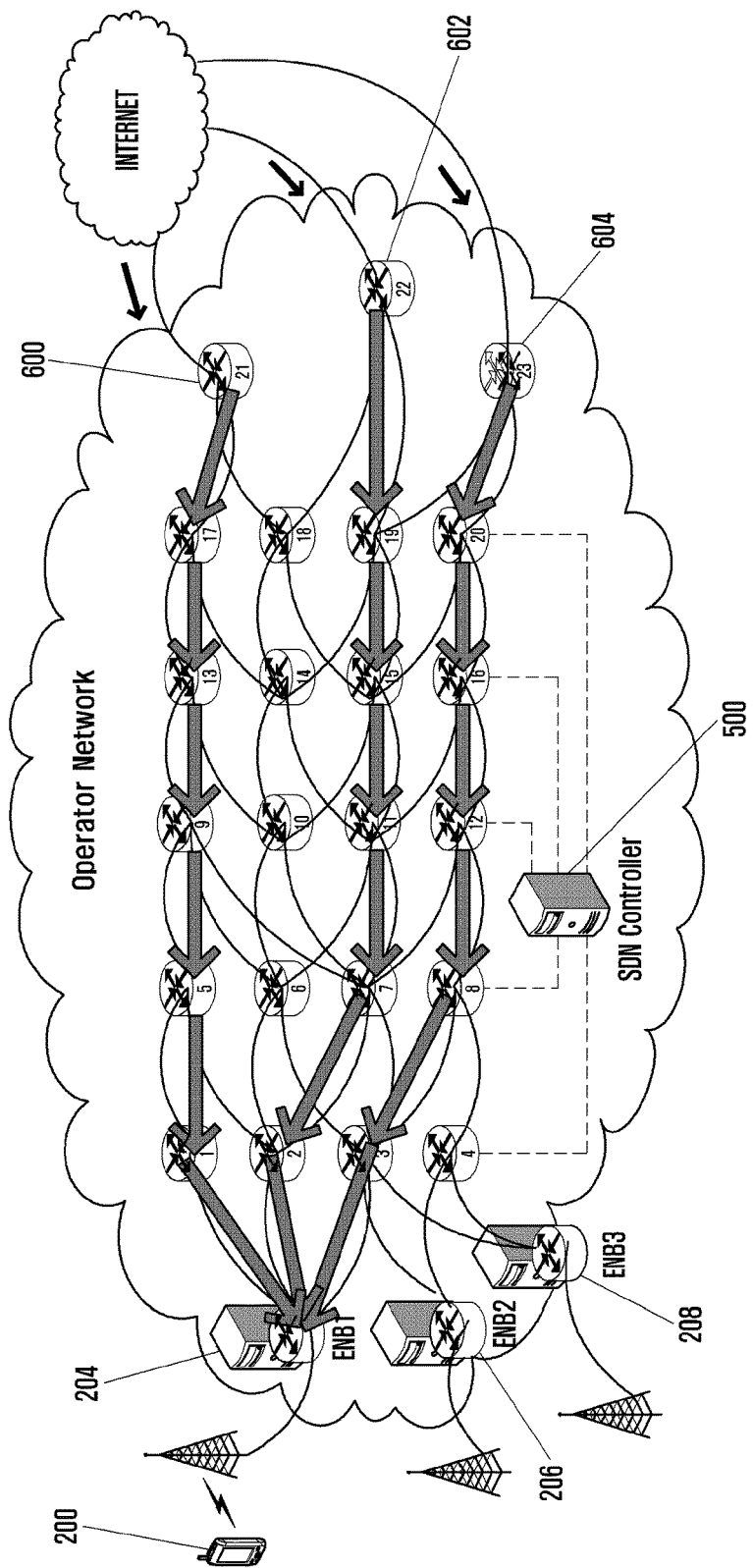

[Fig. 7]
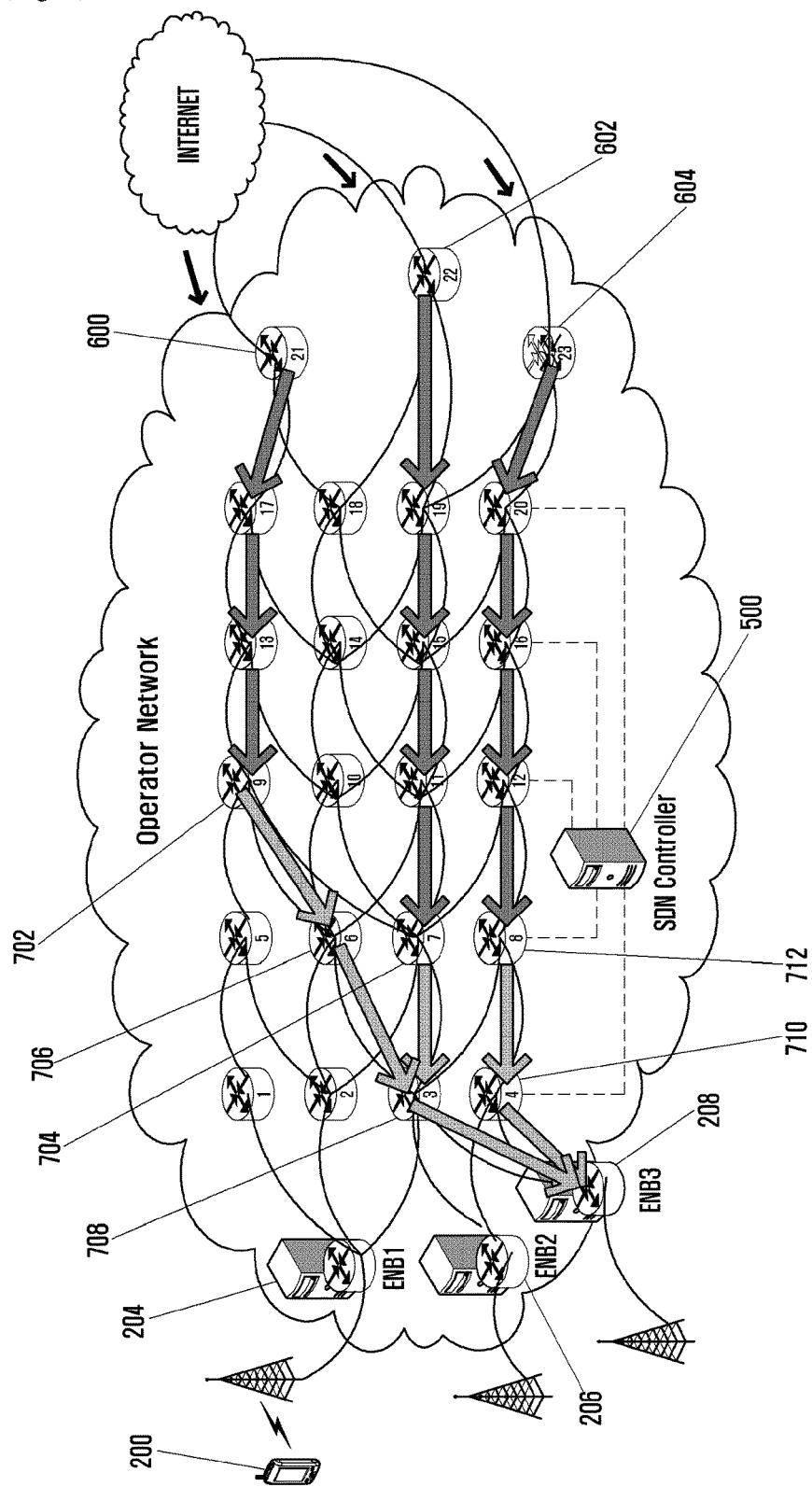

[Fig. 8]
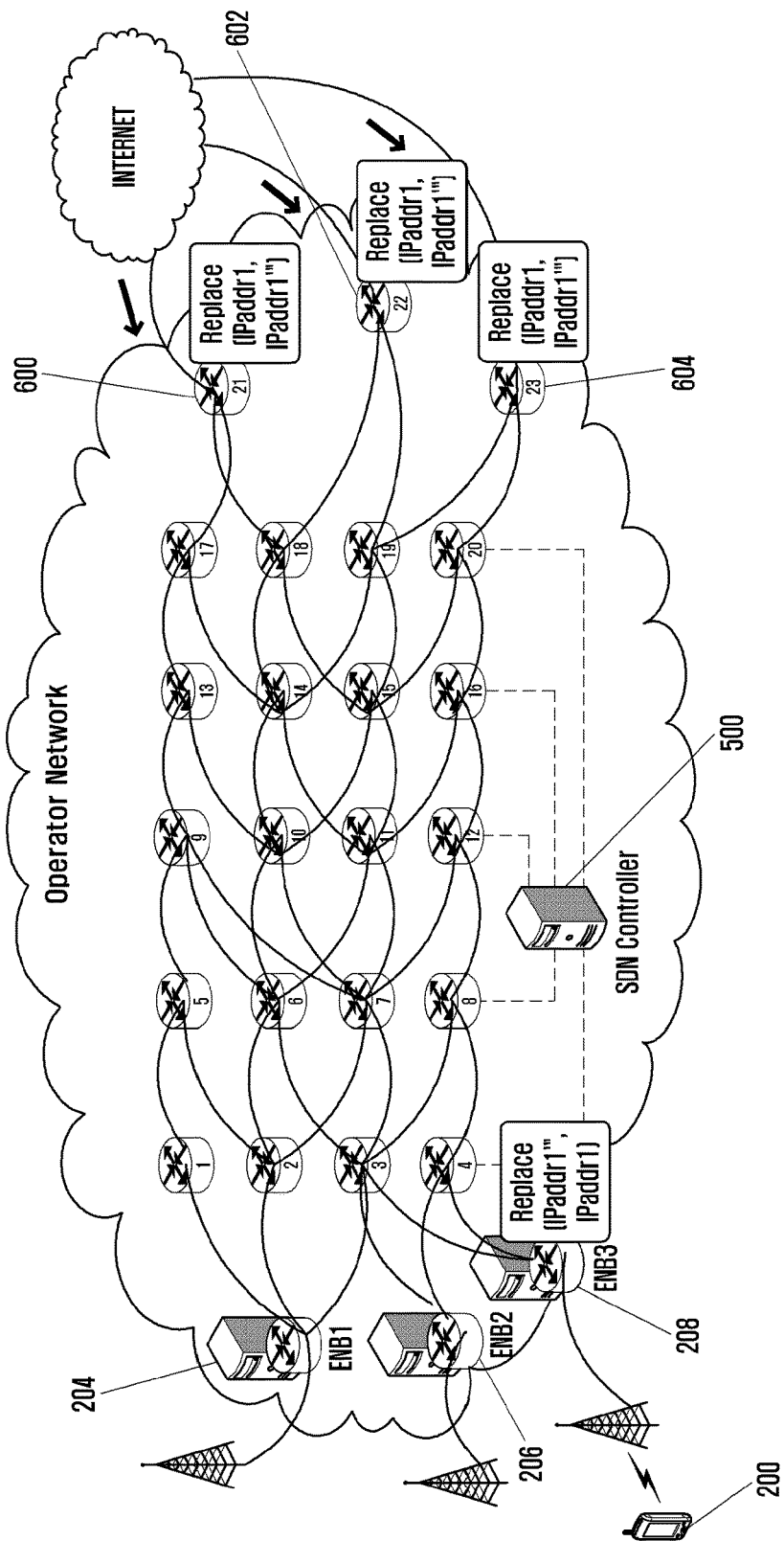

[Fig. 9]
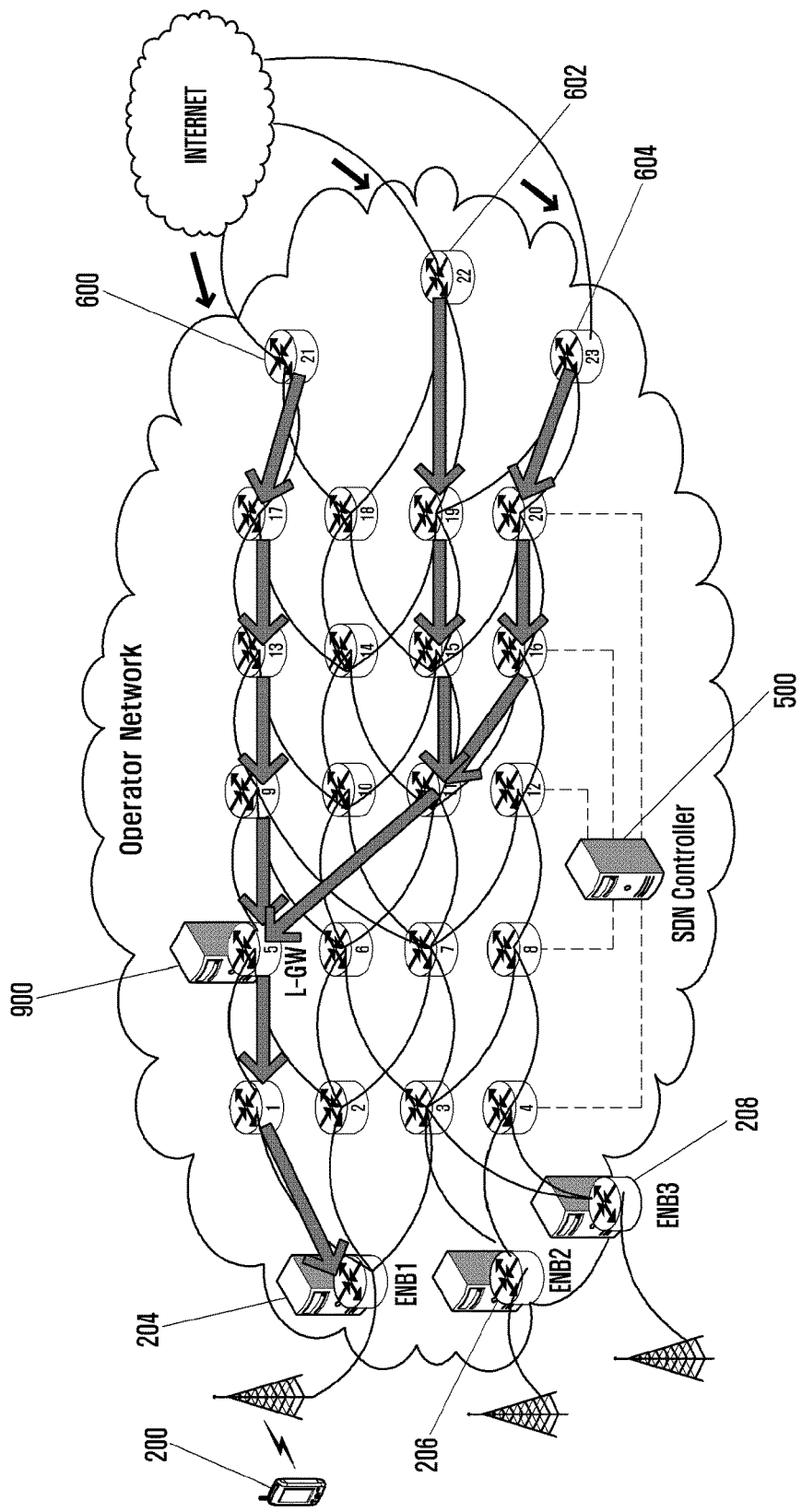

[Fig. 10]
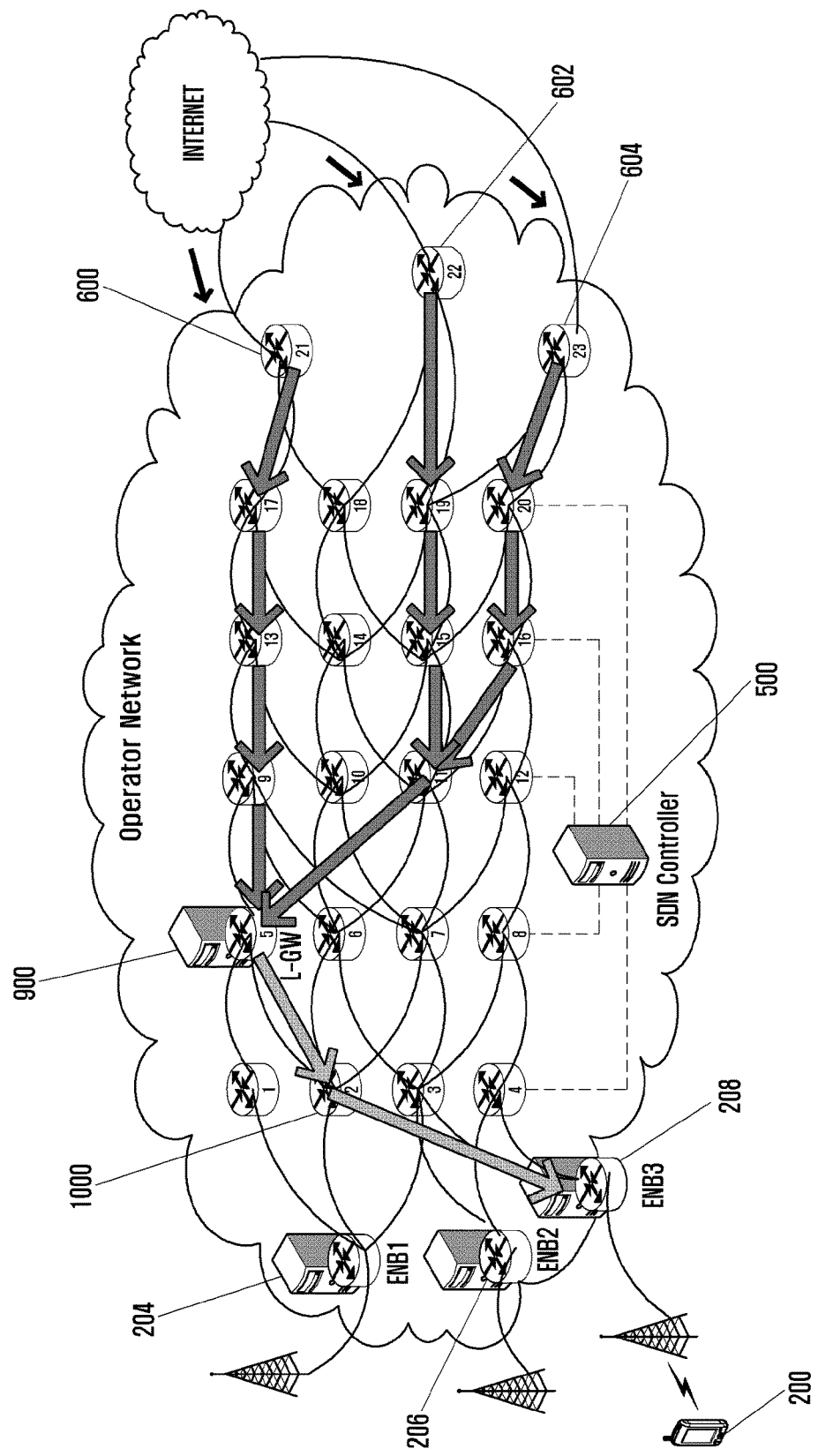

[Fig. 11]
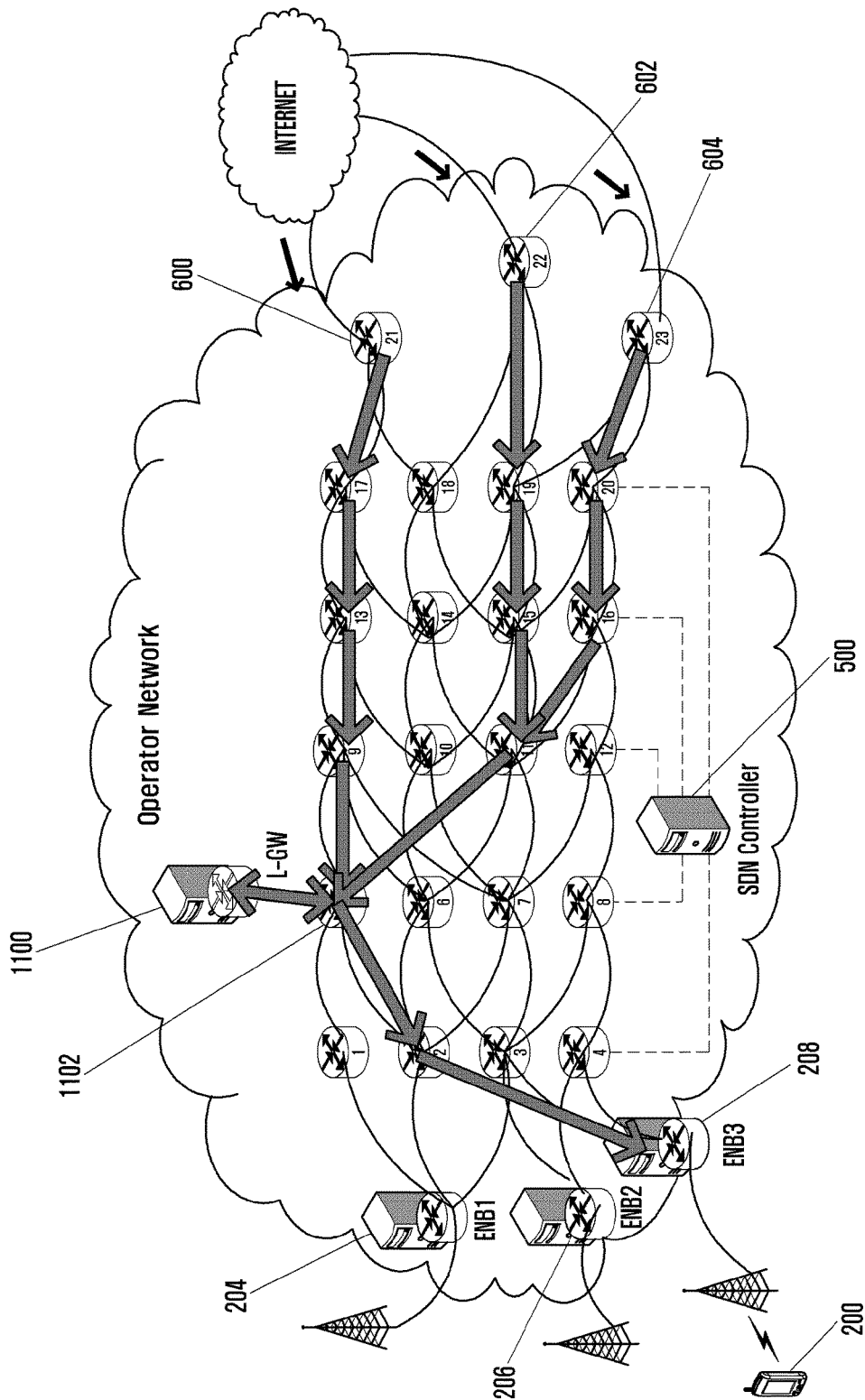

[Fig. 12]
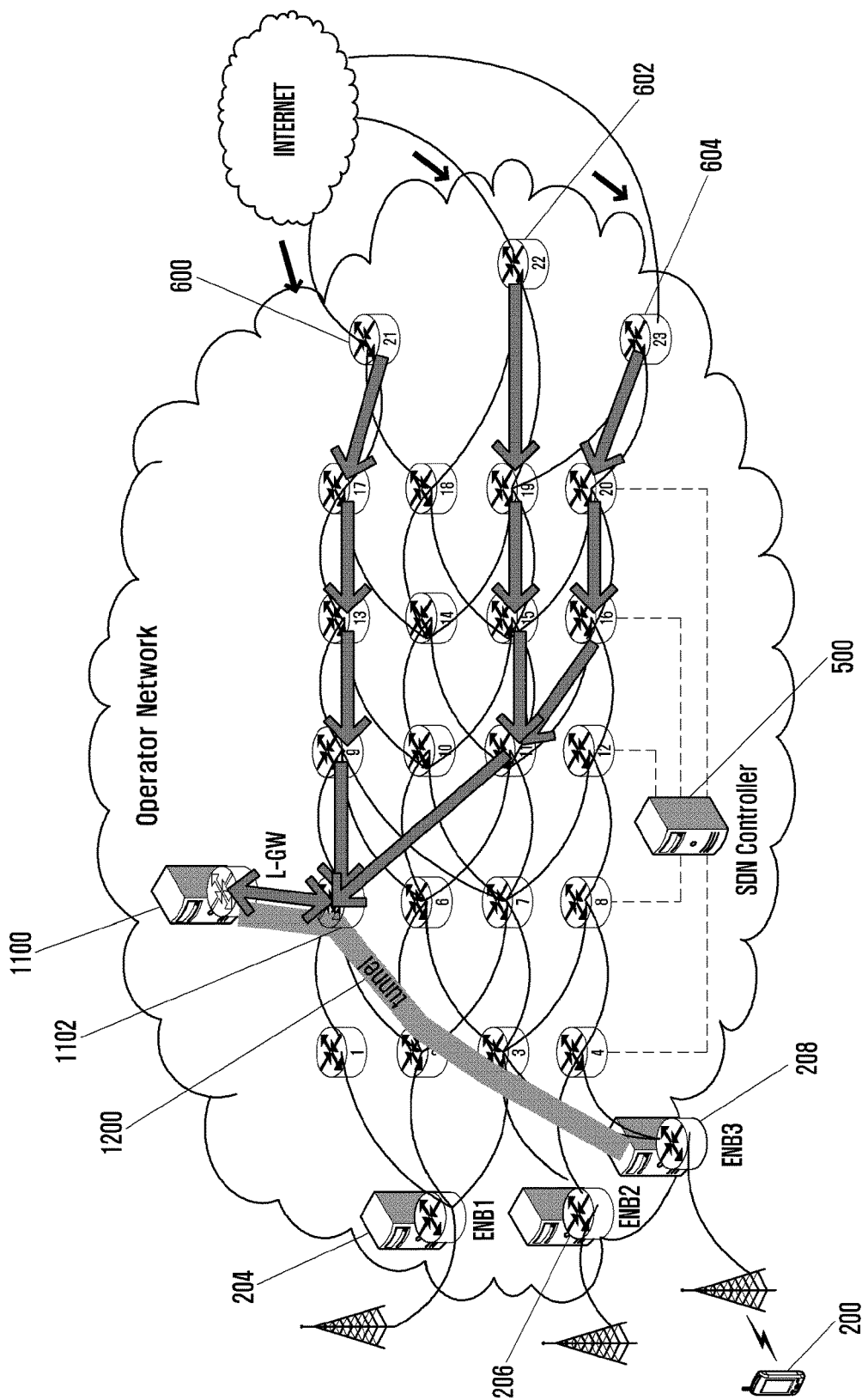

[Fig. 13]
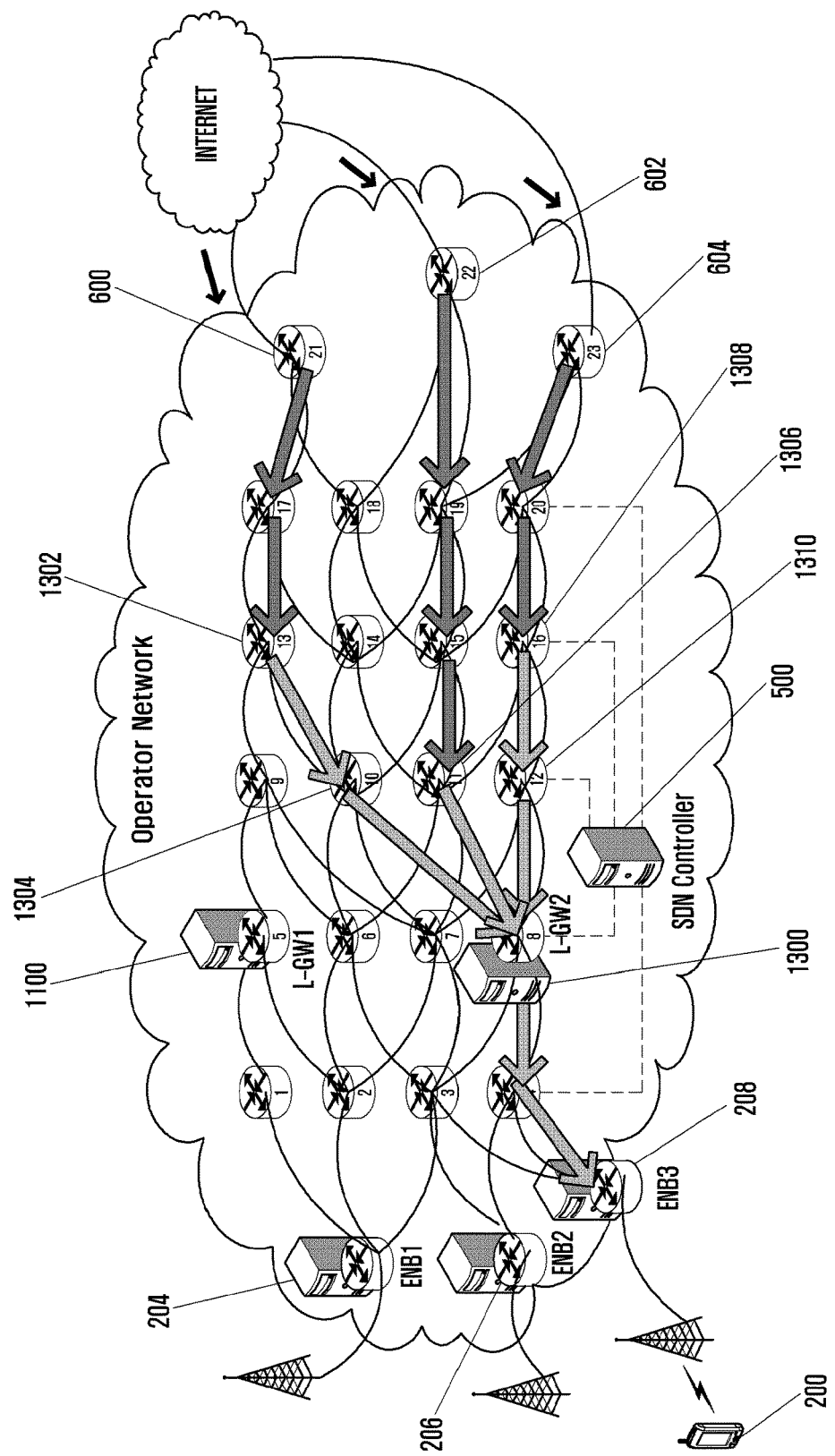

[Fig. 14]
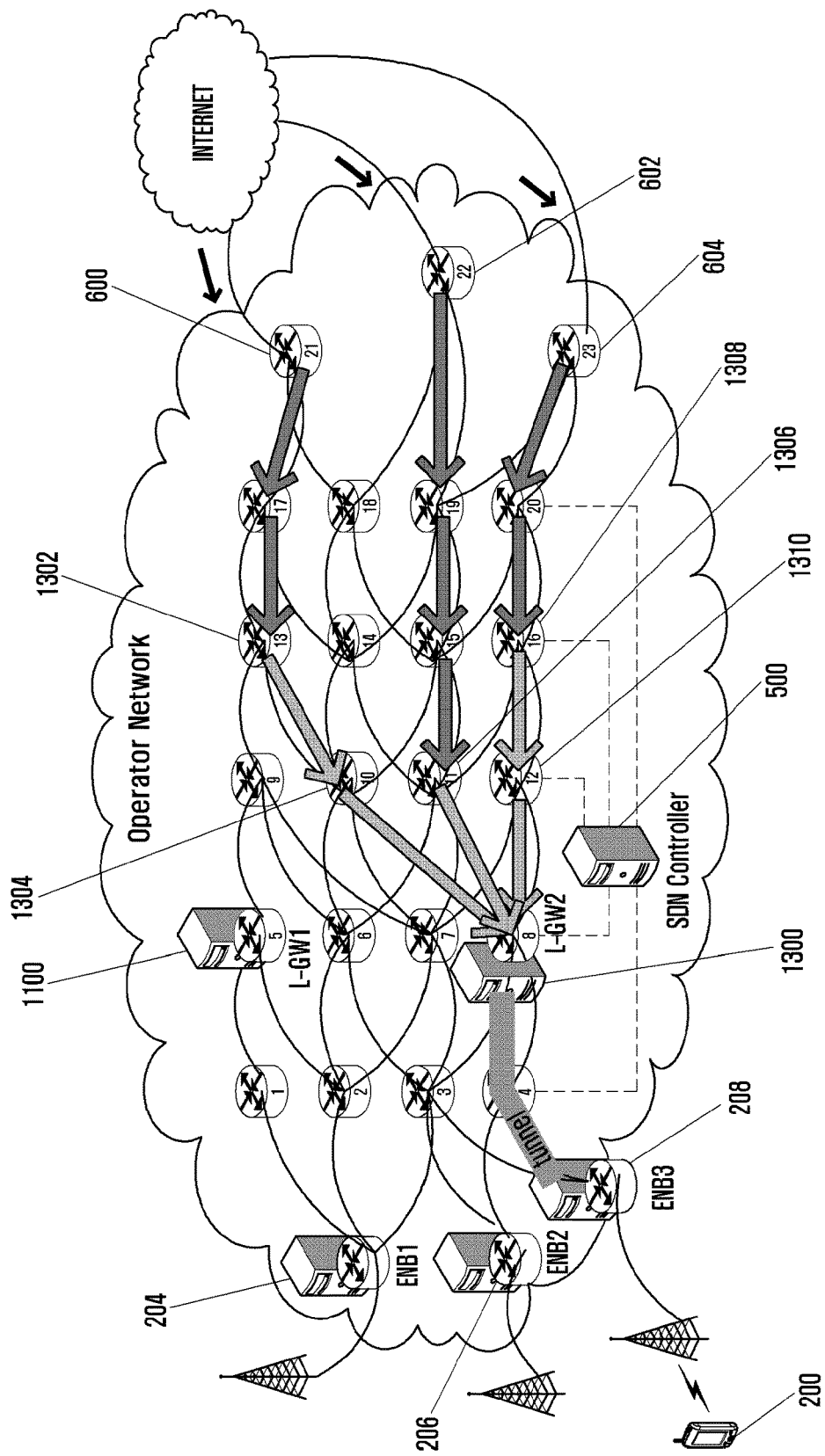

[Fig. 15]
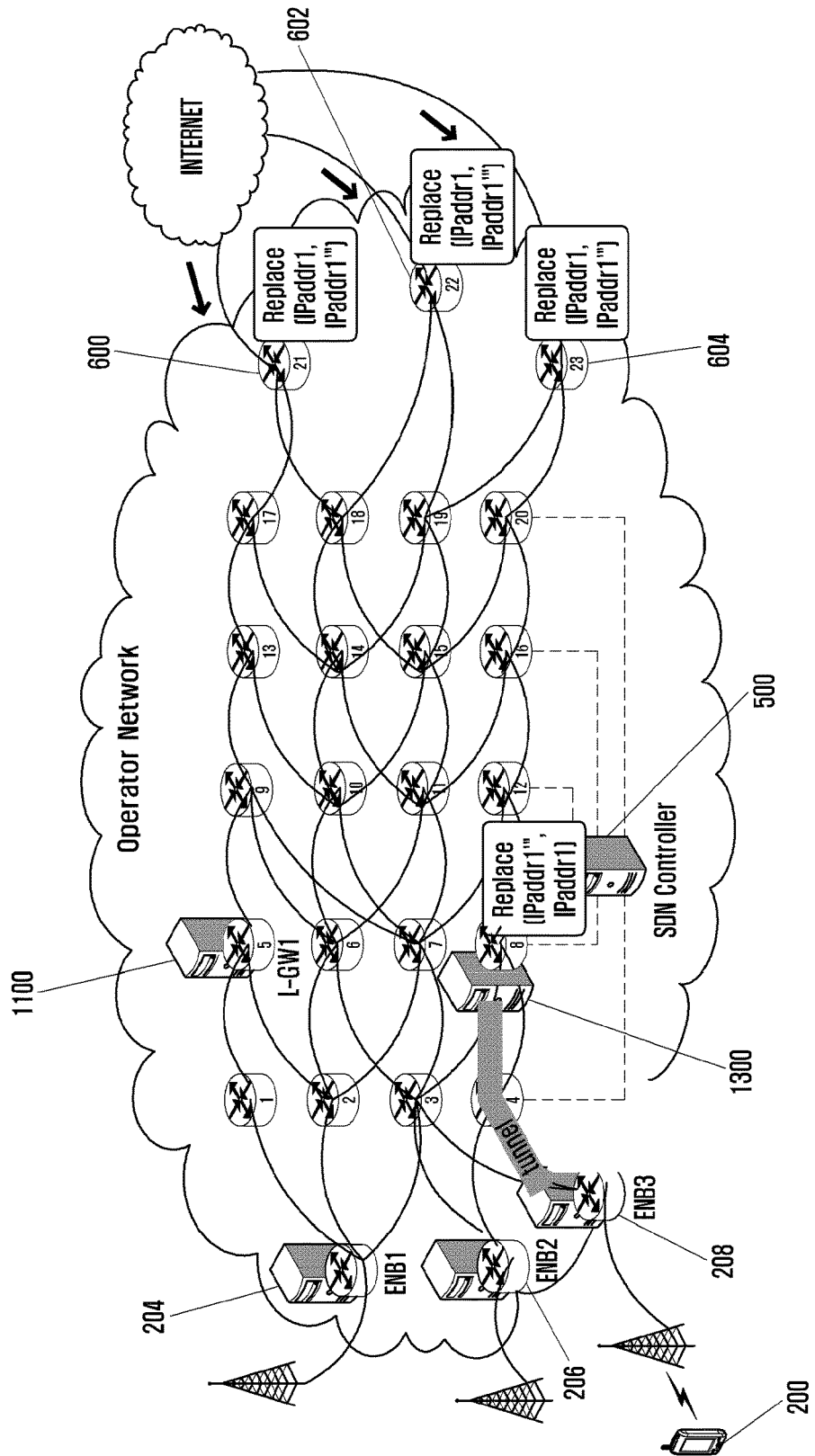

[Fig. 16]
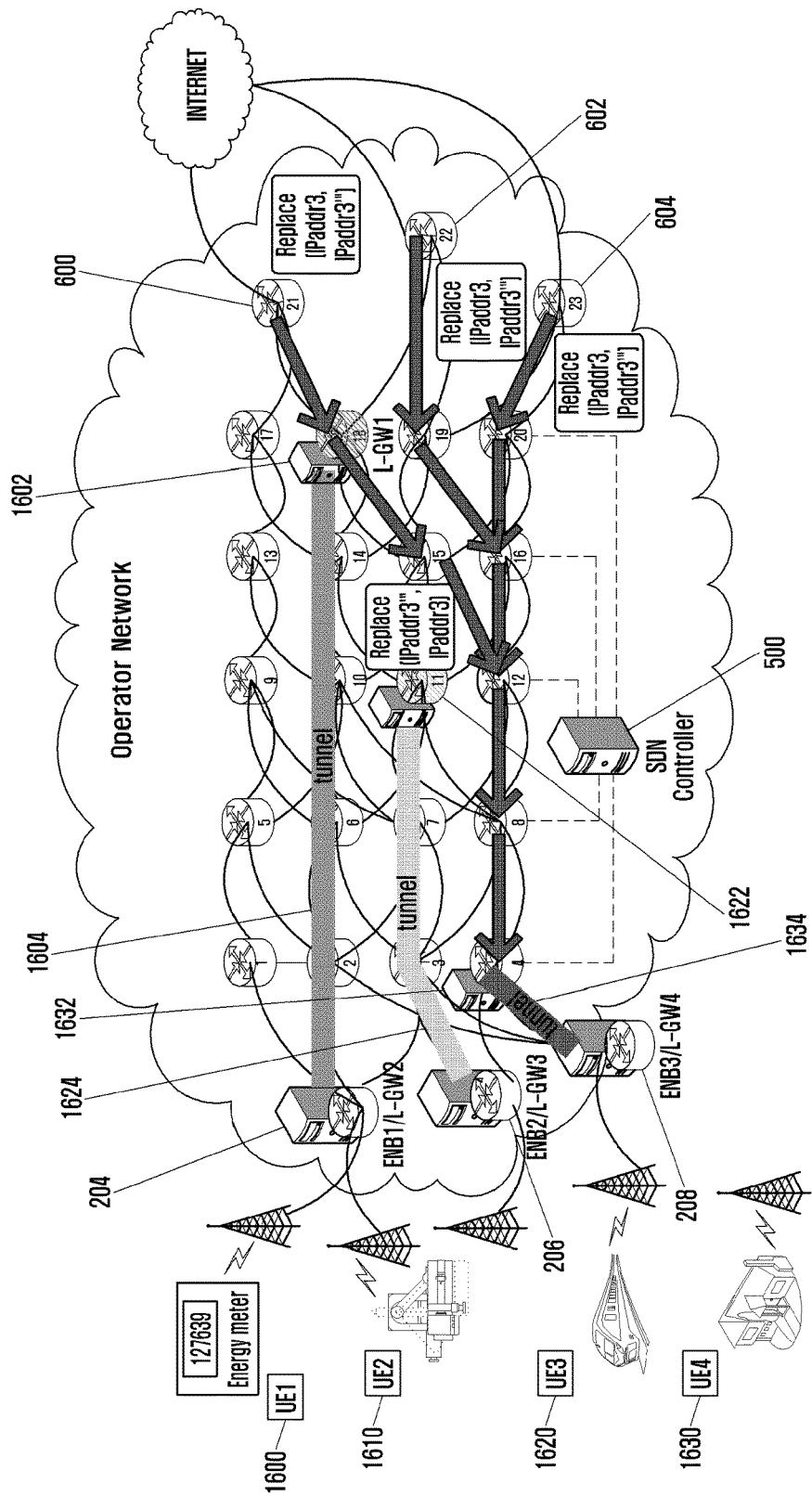

INTERNET PROTOCOL ADDRESS PRESERVATION IN MOBILE OPERATOR NETWORKS

TECHNICAL FIELD

This invention relates to Internet Protocol (IP) address preservation in mobile operator networks. In particular, certain embodiments relate to IP anchor mobility with mobile terminal IP address preservation.

BACKGROUND ART

Wireless or mobile (cellular) communications networks in which a mobile terminal (UE, such as a mobile handset) communicates via a radio link to a network of base stations or other wireless access points connected to a telecommunications network, have undergone rapid development through a number of generations. The initial deployment of systems using analogue signalling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems and Fifth Generation (5G) systems.

3GPP design, specify and standardise technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular on standard for the Evolved Packet Core and the enhanced radio access network called "E-UTRAN". The E-UTRAN uses the LTE radio technology, which offers potentially greater capacity and additional features compared with previous standards. Despite LTE strictly referring only to the air interface, LTE is commonly used to refer to the whole system including EPC and E-UTRAN. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

It is anticipated that 5G mobile communications systems will be rolled-out in the future. Currently, the network structure and wireless access interface to be used in 5G systems has not been decided upon. However, in order to reduce deployment costs and integrate with 4G systems, it is envisaged that 5G systems may utilise some of network architecture currently used in 4G systems.

Consequently, although particular embodiments of the present invention may be implemented within an LTE mobile network, they are not so limited and may be considered to be applicable to many types of wireless communication networks, including future 5G systems. However, due to the greater certainty surrounding the structure of systems based upon LTE network, embodiments of the present invention will predominantly be described with reference to the structure and network elements of LTE based systems. Consequently, an example LTE system is shown in FIG. 1.

The LTE system of FIG. 1 comprises three high level components: at least one UE 102, the E-UTRAN 104 and the EPC 106. The EPC 106, or core network as it may also be known, communicates with Packet Data Networks (PDNs) and servers 108 in the outside world, such as those which form the Internet for example. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signalling is represented by dashed lines.

The E-UTRAN 104, or radio access network (RAN) as it may also be known, comprises a single type of component: an eNB (E-UTRAN Node B) which is responsible for handling radio communications between the UE 102 and the EPC 106 across the air or wireless access interface. An eNB controls UEs 102 in one or more cell. LTE is a cellular system in which the eNBs provide coverage over one or more cells. Typically there is a plurality of eNBs within an LTE system. In general, a UE operating in accordance with LTE communicates with one eNB through one cell at a time, where an eNB may also be referred to as a mobile base station.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

In additional to the architectural structure discussed above, LTE also includes the concept of bearers, and in particular, EPS bearers, where data transmitted from and received by a UE is associated with a particular bearer. EPS bearers themselves may be formed from an e-Radio Access Bearer (e-RAB) which extends between the UE and EPC and S5/S8 Bearers which extend within the EPC. EPS bearers define how UE data is handled as it passes through the LTE network and may be viewed as a virtual data pipe extending through the core network, where a bearer may have quality of service associated with it, such as a guaranteed bitrate for example. A bearer serves to channel packet data to a Packet Data Network (PDN, also referred to as a Public Data Network) outside of the LTE network via the S-GW and P-GW, where a further external non-LTE bearer may be required to channel data from the EPC to an external network. Each bearer is therefore associated with a certain PDN and all data associated with the bearer passes through a particular P-GW. Each bearer is also identified by a Logical Channel ID (LCID) at the Medium Access Control (MAC) level, where one bearer corresponds to one logical channel.

The data packets transmitted over a particular bearer are also associated with a particular IP flow, where a bearer may have a plurality of associated IP flows. The IP flows associated with a bearer relate to a set of data packets that are exchanged between two nodes, for example, a UE and a video streaming server, which each have an associated IP address.

In the current 3GPP networks, it is assumed that each E-RAB/EPS bearer is handled by one P-GW. This P-GW will allocate the IP address to the UE (to be used for this and potentially other EPS bearers belonging to the same APN) when the UE first connects to the mobile operator network and establishes a data packet pathway from the P-GW to the UE. All packets destined to the UE for this APN will arrive into the operator network via the P-GW, where the P-GW may also be referred to as the IP anchor since the P-GW is the first/last point in the mobile operator network that all packets associated with a particular bearer/UE IP address must pass when being communicated to/from the associated PDN. In particular, routers in the PDN will be configured to route packets with a destination IP address of the UE to a single P-GW. The P-GW tunnels the packets to the S-GW using IP tunnelling, and the S-GW will subsequently tunnel the packets to the eNB to which the UE is connected. The tunnelling may be achieved via the use of IP encapsulation for example, where a packet entering having a destination IP address of the UE may be encapsulated with a new IP address of an intermediate router such as the S-GW. Once the encapsulated packet is received by the intermediate router, the router removes the encapsulation and associated IP address and routes the IP packet based on its destination address i.e. the address of the UE, where this routing may also be based on IP tunnelling. This process and network structure is illustrated in FIG. 2

The network of FIG. 2 has a similar architecture to that of FIG. 1, however, multiple P-GWs 212, 214, 216 and eNBs 204, 206, 208 are shown and the operator network is shown to include one or more routers 202 which assist in routing data packets to and from the appropriate eNB, S-GW and P-GWs, where the links between each individual router are also shown. Packets destined to the UE 200 (e.g. with IPaddr1) will arrive at the operator network via P-GW1 212. At P-GW1 212 the packets will be tunnelled in tunnel1 218 to the S-GW1 210 using IPaddr2 of the S-GW1 as destination address of the tunnel1 218 i.e. packets will be encapsulated using the IP address IPaddr2. Next the S-GW1 210 will remove the IPaddr2 encapsulation and tunnel the packets in tunnel2 220 with destination IPaddr3 of the eNB1 204 in order to deliver the packets to the appropriate eNB. Once received by the eNB1 204, the tunnelling is ended and the packets are transmitted to the UE 200 based on their destination address i.e. IPaddr1.

The routers 202, or switches or network equipment as they may also be known, of the network of FIG. 2 will know how to route IP packets to their IP destination address based on distributed routing protocols. Such protocols may for example include Open Shortest Path First (OSPF) in which routing information is exchanged between routers in order to fill/update a routing table/flow table of each router.

Although only one PDN connection is shown in FIG. 2, in practice a UE may have established many bearers, associated with one or more different PDNs. Therefore a UE may have many connections each of which go through a different P-GW and thus have different tunnelling routes and different IP anchors for each bearer. Furthermore, although also not shown, between the P-GWs and the Internet, there may be one or more routers supporting inter-domain routing protocols such as the Border Gateway Protocol (BGP) and the IP network may be operated by an operator different to that of the mobile network.

FIG. 3 illustrates a network with an equivalent architecture to FIG. 2, however, the UE 200 has moved and is now connected to eNB3 208. Consequently, tunnel2 220 has been altered since it is now tunnels IP packets to eNB3 208 which has IPaddr4 whilst tunnel1 218 remains unchanged since the S-GW and the P-GW of the UE's bearer have not changed. Therefore in the architecture of FIGS. 2 and 3, packets for an bearer enter the operator network via the same P-GW and packets are tunnelled from the P-GW to the appropriate eNB via a S-GW and two IP tunnels 218 220.

By virtue of maintaining a static S-GW and P-GW and using tunnelling, if a UE moves between eNBs, for downlink traffic, only the destination address of the second tunnel 220 is required to be updated (e.g. from eNB1 to eNB3), and there is no need to update any IP-level routing tables in routers. Furthermore, because the IP packets for the UE are tunnelled, the IP address of the UE (IPaddr1) is not used for routing at the network layer and may also remain unchanged. Consequently, the architecture of FIGS. 2 and 3 provide simple routing in which only the destination IP addresses of one or more tunnels is required to be changed.

However, a number of disadvantages may also result from the network architecture of FIGS. 2 and 3. Firstly, when the UE moves to a different part of the network (e.g. different side of the country), the same P-GW will remain in the route between the UE and the Internet or other external network if the UE's IP address is to be preserved. Therefore, it is not possible to change the P-GW of a bearer of a UE whilst preserving the UE's IP address since that P-GW is where all IP packets associated with the bearer (UE IP address) will be routed to by routers in the Internet or other external network. Conversely, if a P-GW is to be changed, the UE IP address will be changed and the connection with the PDN via the previous P-GW may be lost.

DISCLOSURE OF INVENTION

Technical Problem if the P-GW is located in one side of the country and the UE moves to another side of the country, IP packets may follow routes which result in increased propagation delays and potentially increased congestion on the routing pathways due to the extra distance travelled by the IP packets. Furthermore, since the tunnelling may be performed via IP encapsulation, additional overheads are introduced into the user plane, thus reducing available capacity in the operator network.

Solution to Problem

In accordance with a first aspect of the present invention, a method of operating a mobile communications network arranged to communicate data packets between a mobile terminal and a packet data network via one or more routers is provided, wherein the one or more routers include routing information for routing data packets. The method comprises establishing a data packet pathway for communicating data packets between a first Internet Protocol, IP, address associated with the mobile terminal and a second IP address associated with the packet data network, the data packet pathway including a first local gateway, wherein a local gateway is a first point within the mobile communications network through which all data packets communicated over the data packet pathway from the second IP address to the first IP address must pass; communicating one or more data packets between the first and second IP addresses via the data packet pathway; selecting a second local gateway; updating the routing information of at least one of the routers such that the second local gateway replaces the first local gateway in the data packet pathway; and communicating one or more data packets between the first and second IP addresses via the data packet pathway.

In certain embodiments, the data packet routing between the first or second local gateways and the packet data network is based on IP address replacement routing or IP address based routing.

In certain embodiments, updating the routing information includes providing information on the second local gateway to a routing controller; determining, at the routing controller, routing information associated with the first IP address; and updating the routing information of the at least one of the routers based on the determined routing information.

In certain embodiments, when address replacement is used, updating the routing information includes updating the replacement IP address in the at least one router.

In certain embodiments, when IP address based routing is used, updating the routing information includes updating a routing table in the at least one router.

In certain embodiments, selecting the second local gateway comprises selecting the second local gateway based on one or more of the location of the mobile terminal, the mobility of the mobile terminal, the type of data included in the data packets, conditions of the mobile communications network, optimal routing between the mobile terminal and the packet data network, and user plane delay requirements.

In certain embodiments, the data packet pathway includes one or more bearers.

In certain embodiments, the data packet pathway includes one or more IP flows.

In certain embodiments, communicating data packets via the data packet pathway includes routing data packets between the first IP address and the first or second local gateway in accordance with one of IP tunnelling, IP address replacement, IP address based routing.

In certain embodiments, the first IP address is associated with a range of IP addresses allocated to the first local gateway.

In certain embodiments, establishing a data packet pathway for communicating data packets between the first IP address and the second IP address includes selecting the first local gateway based on one or more of the location of the mobile terminal, the mobility of the mobile terminal, the type of data included in the data packets, conditions of the mobile communications network, optimal routing between the mobile terminal and the packet data network, and user plane delay requirements.

In certain embodiments, the first local gateway allocates the first IP address to the mobile terminal.

In certain embodiments, the mobile communications network includes one or more base stations arranged to communicate data packets to the mobile terminal via a wireless access interface and one or more entry routers arranged to communicate packets between the mobile communications network and packet data network, and a local gateway is located at any one of a base station, an entry router, and a router between the one or more bases stations and the one or more entry routers.

In accordance with a second aspect of the present invention, a mobile communications network comprising a mobile terminal, one or more routers for routing data packets between a data packet network and the mobile terminal, and a local gateway, is provided wherein a local gateway is a first point within the mobile communications network through which all data packets communicated from the packet data network to the mobile terminal must pass. The mobile communications network is arranged to establish a data packet pathway for communicating data packets between a first Internet Protocol, IP, address associated with the mobile terminal and a second IP address associated with the packet data network, the data packet pathway including a first local gateway; communicate one or more data packets between the first and second IP addresses via the data packet pathway; select a second local gateway; update the routing information of at least one of the routers such that the second local gateway replaces the first local gateway in the data packet pathway; and communicate one or more data packets between the first and second IP addresses via the data packet pathway.

Advantageous Effects of Invention

It may be preferable that a low mobility smartphone is handled with an L-GW closer to the eNB, thus optimising content provisioning/user plane delay. If the user moves, SDN may be used to support an L-GW change for bearers requiring IP address preservation. If the UE changes speed, SDN may be used to move the L-GW higher up in the network for the appropriate bearers.

BRIEF DESCRIPTION OF DRAWINGS

FIG. 1 provides a schematic illustration of an LTE mobile communication network;

FIG. 2 provides a schematic illustration of the architecture of a mobile operator network in which IP tunnelling is implemented;

FIG. 3 provides a schematic illustration of the architecture of a mobile operator network in which IP tunnelling is implemented;

FIG. 4 provides a schematic illustration of the architecture of software defined networking;

FIG. 5 provides a schematic illustration of the architecture of a mobile operator network in which software defined networking and IP tunnelling are implemented.

FIG. 6 provides a schematic illustration of the architecture of a mobile operator network in which software defined networking and UE IP address based routing are implemented;

FIG. 7 provides a schematic illustration of the architecture of a mobile operator network in which software defined networking and UE IP address based routing are implemented;

FIG. 8 provides a schematic illustration of the architecture of a mobile operator network in which software defined networking and UE IP address replacement routing are implemented;

FIG. 9 provides a schematic illustration of the architecture of a mobile operator network in which software defined networking and UE IP address based routing are implemented;

FIG. 10 provides a schematic illustration of the architecture of a mobile operator network in which software defined networking and UE IP address based routing are implemented;

FIG. 11 provides a schematic illustration of the architecture of a mobile operator network in which software defined networking and UE IP address based routing are implemented;

FIG. 12 provides a schematic illustration of the architecture of a mobile operator network in which software defined networking, UE IP address based routing and IP tunnelling are implemented;

FIG. 13 provides a schematic illustration of the architecture of a mobile operator network in which software defined networking and UE IP address based routing are implemented;

FIG. 14 provides a schematic illustration of the architecture of a mobile operator network in which software defined networking, UE IP address based routing and IP tunnelling are implemented;

FIG. 15 provides a schematic illustration of the architecture of a mobile operator network in which software defined networking, IP tunnelling and UE IP address based routing are implemented; and FIG. 16 provides a schematic illustration of the architecture of a mobile operator network for different UE usage scenarios;

MODE FOR THE INVENTION

In recent years there has been increased interest in operating IP networks based on the Software Defined Networking (SDN) concept. Rather than relying flow/routing tables to be updated by distributed routing algorithms, in an SDN architecture there is a central SDN controller or equivalent entity that updates the flow tables in the individual routers such that routing can be controlled centrally and/or dynamically.

FIG. 4 provides an illustration of an example SDN architecture proposed by the Open Network Foundation (ONF). The architecture includes three layers: an infrastructure layer 402, which is primarily formed of routers such as those of FIGS. 2 and 3 for example; a control layer, which includes one or more SDN controllers which may control the routers of the infrastructure layer by, for example, populating their flow tables; and an application layer, in which applications are located that can ask an SDN controller to update/reconfigure the infrastructure layer in order to control IP packet routing.

Networks based on SDN may have a number of advantages due to their adaptability and resulting ability to reconfigure their behaviour without altering the router architecture. In one example, packets may be routed according to the type of data which they are carrying such that particular data types may be handled by particular routers and servers which are most suitable for handling such data rather than simply being handled by a predetermined P-GW. For instance, packets which represent communications that require low-latency may be communicated via a different route compared to packets that represent delay-tolerant but high throughout communications. Furthermore, dynamic routing may be implemented in which routing can be dependent on the direction of communications i.e. uplink or downlink, the current operational state of routers i.e. operating correctly or failing, or the geographical location of the end points. In yet further examples, SDN may be used to route packets without the need for tunnelling and thus reduce overheads, and to alter the routing of packets whilst keeping the source/destination IP addresses static.

FIG. 5 provides in illustration of an example LTE mobile communications network in which SDN has been integrated to control the routers 202. The network of FIG. 5 is substantially similar to those of FIGS. 2 and 3 but instead of distributed routing, an SDN controller 500 is provided which is operable to populate/configure the flow tables of the routers 202 in accordance with a routing protocol such as OpenFlow.

As in FIG. 3, packets destined for UE 200 may be initially routed through tunnel1 218 and tunnel2 220 from P-GW1 212 to S-GW1 210 to the serving eNB 208 which has IPaddr4, where the tunnel2 220 includes link1 502. However, unlike conventional mobile networks, if link1 502 fails, the routers forming link 1 502 would report this to the SDN controller 500. The SDN controller may then examine the link capacity left-over on each link in the area and decide on an appropriate rerouting. For example, the SDN controller may decide to update the flow table entries for IPaddr4 in a number of routers, so that the tunnel2 220 (and maybe also any other packets using IPaddr4 of eNB3 as destination address) will now be routed over link2 504 and link3 506.

In FIG. 5, the SDN controller 500 is shown to only be connected to a subset of the routers, however, the SDN controller would typically be connected to all the routers such that it may control the routing capabilities of the whole operator network. Furthermore, although it is shown that a single SDN controller may be used, one or more SDN controller may be used where the SDN controllers are also in communication with each other as well as the routers in order to ensure that flow table entries are synchronised.

Although the architecture of FIG. 5 is based upon SDN and thus elements of the routing may be more efficient and more adaptable, the principles of operation of the network remain unchanged. For example, tunnelling is still used between the P-GW and the S-GW and between the S-GW and the serving eNB, and the entry to the mobile network is via a single P-GW, which may have been determined upon the original establishment of the EPS bearer, and cannot be moved without loss of the PDN connection. Consequently, a number of the potential advantages of SDN in terms of reduced tunnelling overheads and content dependent routing are not realised. Therefore, as a further step in the integration of the operator network and SDN, tunnelling may be replaced with SDN using IP address specific based routing such that the operator network is based fully upon SDN.

FIG. 6 provides an illustration of an example SDN network implementation where all tunnelling has been replaced with routing based on UE IP addresses. More specifically, each packet is routed based on its destination IP address i.e. an IP address of the UE which has been allocated from an overall IP address pool of the operator in the downlink Since all routing is performed using UE IP addresses as opposed to tunnelling, packets may enter the operator network from any interface connecting the operator network to the Internet and both the S-GW and P-GW may be eliminated from the network.

As can be seen from FIG. 6, the IP packets destined for the UE 200 arrive at the operator network via any router connected to the Internet, and in particular via entry routers 600 602 604. All routers receiving packets destined for IPaddr1 of the UE will have to be configured with a correct route i.e. towards eNB1 204. Since all routers in the operator network can route the IPaddr1 directly, there is no need for tunnelling. Consequently, the P-GW/S-GW of the network architectures of FIGS. 2, 3 and 5 can therefore in principle be removed and the likelihood of a non-optimum route resulting from a location of an S-GW or P-GW reduced since the flow tables of the routers can be updated by the SDN controller dynamically in response to UE mobility for example.

The SDN solution based only on UE address routing of FIG. 6 would on first inspection appear simple and result in improved routing of packets as well as other SDN related advantages that have been set out above. However, there may also be a number of associated disadvantages.

Firstly, since each packet is routed based on its destination IP address i.e. the IP address of the UE in the downlink, the relationship between a UE's IP address and its physical location is lost. Consequently, each router may be required to have individual flow table entries for each UE, thus resulting in large flow tables in the routers. This may in turn lead to required flow table sizes exceeding the size supported by routers. For example, though some routers may have flow table sizes up to a maximum of 2000 to 200000 entries, this may not be larger enough in view of the millions of subscribers that a network operator may have. Furthermore, even if the flow table sizes were increased, this may lead to an increased costs of production for routers due to additional memory costs, and also increased delays due to the additional time it may take for the address of an incoming packet to be matched to an address in the flow table.

Secondly, since each packet may be individually routed based on its destination IP address, if a UE moves between eNBs, an increased number of flow table entries will be required to be updated compared to the architectures of FIGS. 2, 3 and 5 where only the destination of tunnel1 220 will be required to be updated, and thus only a single flow table entry in the S-GW required to be updated. For example, in FIG. 7 if the UE 200 moves from eNB1 204 to eNB3 208 and the flow table entries of routers 702, 704, 706, 708, 710, and 712 are required to be updated. Thus UEs which have a high mobility may result in frequent updating of a relatively large numbers of flow table entries. Furthermore, additional complexity may also arise from handover when SDN in implemented this manner. In particular, in the current network architecture, the serving eNB transmits the last packet from the previous S-GW before sending the first packet from the next S-GW, thus the last packet marking is done by an S-GW. However, when using SDN it may not be clear how such a last packet may be marked for such a purpose if the S-GW has been eliminated.

Thirdly, via the use of the architecture of FIG. 6 or 7, a single point of entry into the operator network has been lost and different packets may follow different routes to their destination. Consequently, it may not be clear where to position so called "local protocol optimisation" functionality. "Local protocol optimisation functionality" may be used to harmonise/adapt higher layer protocols with radio layer specific characteristics or even provide content from a local source. As an example, an operator may terminate a TCP connection coming from the Internet in a Gateway, and have another TCP connection from the gateway to the UE. This second TCP connection could use TCP settings optimised for mobile communication (e.g. slow start modifications). However as is shown in FIG. 6 or 7 such gateways may no longer be present in an SDN controlled operator network with routing based only on UE IP addresses. Consequently, the only place left to implement this type of optimisation functionality may be at the eNB since all packets for a UE will pass through the serving eNB. Although the placement of optimisation functionality at an eNB in the absence of gateway may allow effective control of optimisation since radio conditions and other local functions can be taken into account, due to the mobility of UEs between eNBs, the optimisation context may regularly change resulting increased reconfiguration and overheads at eNBs and throughout the network as a whole.

Lastly with reference to an SDN controlled operator network with routing based only on UE IP addresses, conventional aspects of mobile communications may become problematic, for example the implementation of paging. In particular, in current operator networks such as those based upon LTE, the S-GW requests the MME to initiate paging of a UE over a large area. However, this would not be possible in an SDN controlled operator network with routing based only on UE addresses of FIGS. 5 and 6 since both the S-GW and P-GW may no longer be required. Consequently, it is not clear which network entity would initiate a paging operation. Although an eNB may initiate paging by making a request to the MME, it would then not be clear which eNB would do so. For example, would it be the eNB to which the UE was last connected or would another mechanism for determining the appropriate eNB be required.

As is clear from the foregoing analysis of an SDN controlled operator network with routing based on UE IP addresses, a number of problems may arise on its application to networks such as those based on LTE and future 5G systems. Consequently, it would be advantageous if these problems can be addressed or at least some of their adverse effects lessened.

FIG. 8 provides a network architecture in which SDN is implemented but where header field replacement or IP address replacement takes place in conjunction with the SDN. The OpenFlow protocol is operable to perform such replacement and thus SDN with address replacement may be implemented using existing SDN controllers and protocols.

Similar to the architectures of FIGS. 6 and 7, tunnelling is no longer used. A UE is allocated an IP address (IPaddr1) from the overall pool of operator IP addresses, and packets for the UE may enter the operator network at any point i.e. any of the entry routers 600, 602, 604. However, when packets for the UE enter the operator network, the entry routers 600 602 604 are configured by the SDN controller to replace IPaddr1 of the UE by an IP address belonging to the pool of IP addresses owned by the current eNB to which the UE is attached. For example, if the UE is currently connected to eNB1 204 which has an IP address of IPaddr1', the SDN controller configures the entry routers to replace IPaddr1 with IPaddr' and configures the serving eNB to replace IPaddr1' by IPaddr1 in downlink IP packets received with IPaddr1'. The eNB will then transmit the packets to the UE based upon IPaddr1. Furthermore, as shown in FIG. 8, upon handover from eNB1 204 to eNB3 208, the entry routers/new eNB are informed that IPaddr1''' should now be used for IP address replacement for IPaddr1 packets, where IPaddr1''' belongs to the IP address pool of the new eNB3 208.

Via the use of IP address replacement, the need to update all routers in between the entry router(s) in the operator network and the serving eNB is reduced since routing is based on an IP address already belonging to the concerning eNB. For example, as shown in FIG. 8, when the UE 200 moves from eNB1 204 to eNB3 208, instead of six router entries being be updated as shown in FIG. 7, the IP address mapping is only required to be updated in the three entry routers 600 602 604 and the destination eNB. Due to this decrease in router updating, the complexity associated with UE mobility is comparable with that when tunnelling is used since routers in between where IP address replacement takes places are not required to be updated. Note that this solution will require coordination between the SDN controller, entry-routers and eNBs so that IP address replacement at these network elements is synchronised.

Although IP address replacement potentially reduces the number of flow table entries that require updating, a number of the aforementioned disadvantages of SDN may not be addressed by the use of IP address replacement. For example there does not appear to be a convenient position for the location of the protocol optimisation functionality, and further aspects such as paging may not be simplified by the use of IP address replacement in combination with SDN.

Local Gateway

In order to address a number of the aforementioned problems related to the use of an SDN controlled operator network in which routing is based only on UE IP addresses that arise due to the removal of the S-GW and P-GW, in accordance with an example of the present invention, a new gateway is introduced into the operator network. The new gateway may be referred to as a Local Gateway (L-GW) and may be located anywhere in the operator network. The L-GW may be selected on a per UE, per bearer or per IP flow basis, where the UE may be allocated an IP address from a pool of IP addresses belonging to the L-GW or allocated an address from the overall network operator pool, and the L-GW may act as an IP anchor for a UE, bearer or IP flow.

FIG. 9 illustrates such an operator network architecture in which SDN is used in combination with a L-GW. Upon first connection of a UE to an eNB (eNB1 204), a router is selected as the L-GW (L-GW 900). The UE may be allocated an IP address from an address pool belonging to the L-GW and therefore UE specific routing between the L-GW 900 and the entry routers 600 602 604 of the operator network may not be required. Instead routing may performed based on L-GW address ranges i.e. non-UE address only routing, thus both simplifying and reducing the size of the flow tables of the routers between the L-GW and the entry routers compared to full SDN without a L-GW. For example, routing from the entry routers to the L-GW may be performed using wild-carded flow table entries based upon address range(s) belonging to the L-GW.

The router determined to be the L-GW for a UE may be a conventional router, one of a number of routers which have been configured to potentially act as L-GW, or any router within the operator network if all have been configured to function as a L-GW. Although it is presumed that each L-GW will be allocated a range of IP addresses and a UE may initially be allocated an IP address from said range, the use of a L-GW is not limited to this. For example, in some instances if a UE moves between L-GWs, the UE may retain its previously allocated IP address and therefore would not have an IP address which belongs to the range of the L-GW to which it is currently connected.

Further advantages of the use of a L-GW can be seen in FIG. 10, where the UE 200 has moved from eNB1 204 to eNB3 208. Upon the UE movement from eNB1 204 to eNB3 208, the L-GW 900 does not change and thus the UE maintains its IP address which was selected from the range belonging to the L-GW 900. Consequently, flow tables of routers between the L-GW and the entry routers are not required to be updated due to the movement of the UE between eNBs. However, the routers between the L-GW and the serving eNB are required to be updated, thus the flow tables of the router acting as the L-GW 900 and router 1000 are required to be updated. Nevertheless, the use of a L-GW still leads to a reduction in the number of routers required to be updated compared to the network architectures of FIGS. 6 and 7, though at the expense of a less optimal route. Furthermore, since all packets for the UE or associated with a particular bearer travel through the L-GW, the L-GW also provides a central point at which protocol optimisation may take place, thus elements of the functionality associated with a S-/P-GW may be located at the L-GW i.e. the L-GW may act as an IP anchor.

Although a number of advantages may arise from the network architectures of FIGS. 9 and 10, problems may occur if the packets from the entry routers to the L-GW and packets from the L-GW to the eNB traverse the same router. For example, in FIG. 11, the L-GW 1100 has been selected such that the path between the entry routers and L-GW (right-hand side routing), and between the L-GW and the eNB (left-hand side routing) both pass through router 1102. Therefore, if a same destination IP address is used for both the communication between the Internet and L-GW, and between the L-GW and the eNB (UE IP address selected from L-GW range), the router 1102 may be unable to distinguish between the directions in which packets are travelling. Thus different destination IP addresses may be required to be used, which may increase the complexity of routing and may also limit the use routing techniques such as IP address replacement. However, as shown in FIG. 12, the use of tunnelling between the L-GW and the serving eNB may overcome the problem of address conflicts when a L-GW is selected as shown in FIG. 11.

FIG. 12 provides an illustration of an operator network using SDN and a L-GW where tunnelling between the L-GW and the serving eNB is used. The routing of packets between the L-GW and the entry routers in FIG. 12 is the same as that in FIGS. 10 and 11, however, the packets between the serving eNB3 208 and the L-GW 1100 are tunnelled using tunnel 1200, where packets sent between the eNB3 208 will be tunnelled using the IP addresses of eNB3 208 and the L-GW 1100. Compared to the architecture of FIGS. 5 to 8, using tunnelling to the left-side of the L-GW removes the possibility of routing errors due to conflicting destination IP addresses.

Local Gateway Mobility

In FIGS. 9 to 12, the routing of packets to and from the UE is via a fixed L-GW and routing between the L-GW and the entry routers is based upon the UE IP address which may have been select from the IP address range owned by the L-GW. However, if a UE were to move between eNBs, an original L-GW may no longer represent an efficient route since it may be geographically distant from the newly serving eNB. Consequently, in another example of the present invention, L-GW mobility may be supported within an operator network using SDN. Allowing a L-GW to be reselected when a UE moves between eNBs enables a L-GW to be selected based on the position of the UE and thus improved routing through the operator network may be obtained compared to being limited to fixed L-GWs.

In order to enable reliable routing between a L-GW and the entry routers, if SDN were not to be used, when a UE moves between L-GWs it may be required to also change its IP address to one belonging to the new L-GW, which may in turn lead to loss of connections and bearers at the UE. However, via the use of SDN to update the UE address based routing of routers between the L-GW and the entry routers, a UE may transfer between L-GWs i.e. transfer its IP anchor, whilst maintaining its IP address (IP anchor mobility with IP address preservation) since the flow tables of the routers between the L-GW and the entry routers may be updated by the SDN controller for the relevant UE IP addresses. Consequently, adaptable routing via the movement of IP anchors may be obtained without loss a UEs IP address when SDN is used in combination with L-GWs. Furthermore, as is set out below, the use of SDN to update the UE address based routing in combination with L-GW may be optimised in order to reduce flow table updates and tailor the operation of the network to different data types and applications. Consequently, the location of a L-GW may change without a PDN connection being lost because a UE IP address is no longer associated with a single fixed P-GW and the flow tables of the routers may be configured by an SDN controller to take account of the relocation of an L-GW. Consequently, IP anchor mobility may be provided along with UE IP address preservation—something which is not possible in existing mobile operator networks.

FIG. 13 provides an example of an operator network using SDN to update the UE address based routing and L-GWs, where a L-GW associated with UE 200 has been moved. In FIG. 13, in response to movement of the UE 200 from the eNB1 204 (shown in FIG. 12) to eNB3 208, the location of the L-GW 1300 has been changed from L-GW1 1100 to L-GW2 so that a more optimal route between the serving eNB and the L-GW is achieved. To enable this, a number of the flow tables of the routers (1302, 1304, 1306, 1308, 1310) between the L-GW and the entry routers are required to be updated such that packets with a destination address of IPaddr1 are correctly routed to L-GW2 1300. For example, the routers to the right of the L-GW would still have non-UE specific wildcarded entry routing for the IP address range belonging L-GW1 1100, but there would be a higher priority flow table entry routing the specific IPaddr1 of UE1 to L-GW2. However, UE-individual flow table entries in the routers to the right of the L-GW may happen only for UE's moving further away from the L-GW. The routers to the left of the L-GW would also require updating but due to the L-GW being closer to the eNB than the entry routers in this example, it is likely that fewer router updates would be required compared to the right-hand side.

FIG. 14 provides a further example of an operator network using SDN and L-GWs in which the L-GW has moved. The operation of the network of FIG. 14 is similar to that of FIG. 13, however, IP tunnelling is utilised between the L-GW and the serving eNB. Therefore, upon UE mobility which results in a change of L-GW from L-GW1 1100 to L-GW2 1300, the routers between the L-GWs and the eNBs do not require updating since only the destination addresses of the tunnel are updated. Therefore, compared to FIG. 13, individual UE entries in the routers between the eNBs and the L-GWs may not be required and the therefore the number of router flow table updates may be reduced. However, this reduction in updates may result in increased overheads in the user plane due to the use of IP encapsulation associated with the tunnelling and the number of routers (1302, 1304, 1306, 1308 1310) that are required to be updated between the L-GW and the entry routers remains unchanged.

Referring back to the disadvantages associated with the use of an SDN controlled operator network only routing based on UE addresses without a L-GW, by the provision of a L-GW and/or a L-GW that may be repositioned, a number of the disadvantages are addressed. For example, for routers between a fixed L-GW and the entry routers the number of flow table entries is reduced since an individual entry for each UE may not be required but instead non-UE specific routing may be used in case of limited UE mobility. Furthermore, with regards to routers between an eNB and the L-GW, since all packets are arriving from the L-GW (one entry point), only the route from the L-GW to the concerning eNB needs to be covered, thus the number of flow tables entries is also reduced for these routers. Lastly, if tunnelling is used in combination with a L-GW, individual UE entries will not be required in the flow tables of routers between the L-GW and eNB, thus reducing the size of flow tables and their update frequency.

If the L-GW is not fixed and a UE's IP address is to be maintained, routing may be easily optimised to the location of the eNB. However, the flow tables of a number of routers between the L-GW and the entry routers may requiring updating since the UE IP address may no longer belong to the range of address owned by the current L-GW, thus the flow table updating complexity may be similar to those associated with an SDN controlled operator network implementation only routing based on UE IP addresses in which a L-GW is not used.

A further advantage of the use of a L-GW is that it provides a central point other than an eNB at which protocol/content optimisation functionality may be provided. Since in some examples the position of the L-GW may still change without changing the UE IP address, a context move may still be required to be supported. Furthermore, since a L-GW will be positioned between the eNBs and the entry routers, it provides a more appropriate location for the initiation of paging functionality.

As explained above, in some examples the number of flow table updates required when a L-GW is relocated due to UE mobility may be similar to those required when an operator network uses SDN without L-GWs. In order reduce the number of flow table updates required, in accordance with another example of the present invention, IP address replacement may implemented based on SDN between L-GW and entry routers.

FIG. 15 illustrates an operator network using SDN with a moveable L-GW where tunnelling is used in combination with IP address replacement. More specifically, as can be seen in FIG. 15, tunnelling is utilised between the serving eNB and the L-GW, and IP address replacement described with reference to FIG. 8 is utilised between the L-GW and the entry routers. In particular, at the entry routers IPadd1 is replaced with IPaddr1''', and at the L-GW 1300 IPaddr1''' is replaced with IPaddr1, where the IP address replacement may also be controlled by an SDN controller.

Taking the example where the UE moves from eNB 204 to eNB 208 and the L-GW moves from L-GW1 1100 to L-GW2 1300, only the address mapping of the entry routers between the L-GW and the outside networks are required to be updated. Thus, however large the operator network, the only routers required to be updated between the L-GW and the Internet are the entry routers. Consequently, although the complexity gains in the network illustrated FIG. 15 are relatively small (three routers being updated as opposed to five in FIG. 13), the gains are likely to increase with network size. Furthermore, since tunnelling is used between the L-GW and the eNB, the flow tables of the routers between the L-GW and the eNB are not required to be updated since only the tunnel destination addresses are required to be updated.

Although the use of IP address replacement may also be used between the serving eNB and the L-GW, it would likely not be practical to do so if all UL traffic has to pass through the L-GW. For example, in order to ensure that all traffic passes through the L-GW, the destination IP address in all IP packets leaving the eNB in UL would have to correspond to an IP address of the L-GW. Next the L-GW would have to map this address back to the real destination address on the Internet. So if the UE is talking to 1000 peers on the Internet, 1000 L-GW addresses would have to be reserved for this one UE, which is an inefficient use of IP addresses. Consequently, tunnelling using IP encapsulation provides more suitable choice of routing for communications between the serving eNB and the L-GW.

As described with reference to FIGS. 13 to 15, via the use of a L-GW and SDN, the IP-anchor of a UE i.e. the L-GW, can be moved whilst maintaining the IP address of the UE such that PDN connections can be maintained. Furthermore, a number of further routing techniques such as tunnelling and IP address replacement allow the routing within an operator network to be controlled in order to achieve improved routing and/or fewer flow table updates. Therefore, the exact combination of the routing techniques to be used in an operator network may depend the network operator's requirements.

Up to this point, L-GWs have been described as being selected on a UE by UE basis, however, L-GWs may also be selected on a bearer by bearer or an IP flow by IP flow basis such that a UE may be associated with multiple L-GW where the L-GWs may vary in their location depending on the routing characteristics that each bearer/IP flow requires. Furthermore, these different L-GWs may have different associated routing techniques, for example, a first L-GW may use tunnelling and SDN implementation UE address based routing and a second L-GW may use tunnelling and SDN implementing UE address replacement.

As set out above, each routing techniques such as tunnelling, SDN and address replacement and the location of the L-GW have associated advantages and disadvantages. Consequently, the combination of routing techniques used in connection with a particular L-GW location may be selected based on the requirements of the UE or the type of data that is being communicated via the L-GW. For example, the location of L-GW and the choice of associated routing techniques may be based upon one or more of user plane delay requirements, UE mobility/speed, whether IP address preservation is required, requirement to offload data from operator core network, and the type of data being transmitted. Furthermore, as well as the location and routing techniques associated with a L-GW being determined on connection of a UE to an eNB or the establishment of a bearer, they may also be modified during operation in response to a change of UE location, a change in network conditions or a change in the type of data being transmitted via the bearer(s). For example, for the support of machine-type-communications (MTC) devices, low overheads may be desirable due to the large number of devices whilst the data being transmitted is delay tolerant. Consequently, in may be advantageous to minimise the use of tunnelling and the use of optimal routing may not be critical since user plane delay may be tolerated. Further example implementations of SDN in combination with L-GWs are set out below.

As also set out above, a UE IP address may be preserved when moving between L-GWs. However, for this to occur a standardised L-GW relocation procedure may be required. For example, upon relocation of a L-GW the flow tables and tunnel destinations etc. that require updating would, if possible, be updated simultaneously such that packets are automatically rerouted accordingly. However, if some level of packet loss may tolerated perfect coordination between the relocation of a L-GW and the updating of flow tables may not be required thus simplifying the updating process. Nevertheless, if packet loss cannot be tolerated or is required to be reduced, a more complex switching procedure may be required in which downlink packets are controlled not to arrive at the old L-GW when an old tunnel has been removed and/or flow table in routers closer to the entry routers are prioritised when flow table updates are being performed. In addition to or as an alternative to the foregoing approaches, packets may be buffered at one or more locations, such as the entry routers for instance, whilst reconfiguration of the L-GW and routers of the operator network is taking place. However, this may result in increased delays in the delivery of the packets. Similarly, packet forwarding between an old and new L-GW may also be performed to reduce packet loss. In other examples, flow optimisation contexts could also be forward between L-GWs (i.e. IP anchors)

As set out above, tunnelling, SDN with UE address based routing, and SDN with UE address replacement, have a number of associated advantages and disadvantages which may vary with the position of the L-GW and the whether are utilised between the eNB and the L-GW or between the L-GW and the entry routers. These advantages and disadvantage are summarised below.

Routing Between eNB and Local Gateway

Tunnelling efficiently handles UE mobility and a change of L-GW since only the destination addresses are required to be changed. However, this may come at the cost of increased user plane overheads due to the IP encapsulation. Consequently, tunnelling would appear to provide an efficient solution for routing between the L-GW and eNBs.

SDN with UE IP address based routing may be relatively poor in terms of efficiency when mobility is considered since a large number of router flow tables may be required to be updated as well as individual UE entries in the flow tables. Consequently, SDN with UE address based routing would appear to be useful when there are a low number of UEs and little or no mobility such as that flow table updating is not regularly required.

SDN with IP address replacement provides an improvement in terms of update efficiency compared to SDN with UE IP address based routing when mobility is considered. However, as set out above, it may lead to a large number of uplink addresses being required at the L-GW, therefore it would appear appropriate for use when a limited number of destination addresses are being used in the uplink since only the entry routers to the operator network are required to be updated.

Routing Between Local Gateway and Entry Routers

As for routing between the eNBs and L-GW, non-UE specific routing based on L-GW owned IP addresses may be a good solution if the concerning UE is stationary, if IP address preservation is not required at mobility, or there is only limited UE mobility and the L-GW can continue to act as L-GW for all eNB's potentially visited by the UE.

SDN with UE address based routing may be an acceptable solution if there is not too frequent L-GW mobility i.e.

majority of mobility can be handled below L-GW thus limiting the frequency of flow table updates. In this case the location of the L-GW should be selected such that L-GW mobility would not occur too frequently i.e. it is positioned further from the eNBs.

SDN with UE IP address replacement provides an improvement in terms of efficiency compared to SDN with UE address based routing when mobility is considered since only the entry routers to the operator network are required to be updated. Consequently, it would appear to be suited to scenarios where IP preservation is required and L-GW mobility may occur.

Local Gateway Position

In terms of L-GW placement, a number of trade-offs also arise. For example, placement of a L-GW close to the eNB will typically result in low user plane delay but either no IP address preservation at UE mobility, frequent L-GW UE context movement (including UE IP address preservation) and flow table updates at UE mobility, or suboptimal routing if an initial L-GW remains after UE mobility.

If the L-GW is positioned further from the eNB, an increased user plane delay will typically occur due to suboptimal routing but easier IP address preservation at UE mobility and less frequent L-GW UE context movement may result since a single L-GW may act for several eNBs. Furthermore, positioning a L-GW further from the eNB may lead to reduced costs of server availability as the network will likely become more centralised as you progress further up the router hierarchy.

L-GW positioning provides an important tool in the management of an operator network using SDN, therefore it may be under the control of a central network entity such as the SDN controller, the MME, a dedicated L-GW controller, or via cooperation between one or more of these network elements. However, in some circumstances it may be determine by the serving eNB. Furthermore in order to optimise the L-GW position it may be advantageous if the responsible network element may have access to information relating to one or more of the type of traffic being communicated, current network conditions and UE mobility for example.

In view of the characteristics of the various routing techniques, appropriate routing techniques and L-GW locations can be selected for the different use cases supported by a network i.e. MTC, mobile broadband etc. In order to illustrate the different routing technique and L-GW locations that may be used for different usage scenarios, a number of usage examples an examined below and illustrated in FIG. 16.

Massive MTC

Massive MTC (m-MTC) are characterised by large numbers of mainly stationary devices, such as smart meters, which transmit relatively small amounts of non-time critical data relatively infrequently. Consequently, the level of user plane delay is not critical but it is preferable that data overheads and cost per transmission are relatively small due to the large number of relatively small transmissions. Furthermore, since the devices are mainly stationary the ability to handle UE mobility efficiently is of lesser importance.

Since cost is a major factor in m-MTC communications and communication delays are of little relevance, locating the L-GW further from the eNB may be preferable. For example, in some circumstances it may be located at the network operator's central site such that little or no routing between the L-GW and the entry routers is required. Nevertheless, if required, such routing may be performed using non-UE specific routing (SDN with L-GW address ranges) since the UE are unlikely to be mobile, and even if they were to move, since the L-GW is far away from the eNBs, it may not be necessary change the L-GW. With regards to the routing technique between the L-GW and the eNB, either tunnelling or address replacement may be used, though address replacement may be preferable if the UEs are only communicating with a small number of destination addresses in the uplink (which is likely the case for m-MTC devices) since the overheads associated with tunnelling may be avoided. In FIG. 16, UE1 1600 is an m-MTC device and its L-GW is located in router 1602. Routing between its eNB 204 is illustrated as being performed via the tunnelling using tunnel 1604 though IP address replacement may also be used.

Critical MTC

Critical MTC (c-MTC) may be characterised by a smaller number of mainly stationary devices compared to m-MTC, such as environmental monitoring or machine control and monitoring, which transmit relatively small amounts of time critical data. Consequently, the level of user plane delay is important. Furthermore, similarly to the m-MTC, since the devices are mainly stationary the ability to handle UE mobility efficiently is of lesser importance.

Consequently, it may be preferable that c-MTC UEs are associated with a L-GW close to the UE location or even at the eNB, thus enabling low transport delay. Furthermore, since the c-MTC UEs are likely to be stationary and the L-GW therefore unlikely to change, an IP address owned by the local eNB may be allocated to the UEs (i.e. no UE individual flow table entries and no tunnelling). As a result of allocating a UE an IP address owned by the eNB and low mobility, non-UE specific routing may be used without substantially increasing the likelihood of extensive flow table updates. In FIG. 16, UE 2 1610 is a c-MTC device and its L-GW is located in its eNB 204.

Evolved Mobile Broadband—High Mobility

High mobility evolved mobile broadband (eMBB) is characterised by high data rate applications such as media streaming on a smart phone, where the smart phone is regularly transitioning between eNBs due to travelling at a relatively high speed. Consequently, mobility and eNB changes should be handled efficiently and IP address preservation should be provided to in order to reduce the likelihood of connections being lost. In FIG. 16, UE 3 1620 is a high mobility UE and its L-GW is located in router 1622, where the routing between the eNB 206 and the L-GW 1622 is performed via tunnelling using tunnel 1624 and the routing between the L-GW and the entry routers is performed using IP address replacement as described with reference to FIGS. 8 and 15.

It may be preferable to that a high mobility smartphone user is handled with an L-GW relatively high up in the network. This will allow mobility changes to be handled efficiently with tunnel endpoint address updates, while still keeping content provisioning relatively close to the UE. SDN may be used for bearers requiring IP address preservation (e.g. voice calls) and for bearers not requiring IP address preservation, a new L-GW and new IP address can be allocated upon UE mobility in order to select a L-GW that results in more optimal routing. In order to limit SDN actions i.e. flow table updates, in the case of mobility, between the L-GW and entry routers an approach based on "replacing UE address" may be used.

Evolved Mobile Broadband—Low Mobility

Low mobility eMBB has similar characteristics to that of high mobility eMBB but the requirement for the efficiently handling of mobility is reduced since the likelihood of moving between the eNBs is lower.

It may be preferable that a low mobility smartphone is handled with an L-GW closer to the eNB, thus optimising content provisioning/user plane delay. If the user moves, SDN may be used to support an L-GW change for bearers requiring IP address preservation. If the UE changes speed, SDN may be used to move the L-GW higher up in the network for the appropriate bearers. In FIG. 16, UE 4 1630 is a low mobility UE and its L-GW is located in router 1632 close to the serving eNB 208. The routing between the eNB 208 and the L-GW 1632 is performed via tunnelling using tunnel 1634 and the routing between the L-GW and the entry routers is performed using SDN with UE address based routing.

The above described scenarios, routing techniques and L-GW location combinations are merely examples of the present invention and the various combinations are not limited to use in the scenarios with they have been described nor are the various routing techniques limited to the left-hand side or right-hand side routing (i.e. between the UE and the L-GW and between the L-GW and entry routers). Furthermore, any combination of routing techniques on the right-hand and left-hand sides and L-GW location may be used, though some may be more suitable than others depending on the usage scenario.

The combination of routing techniques and L-GW locations may also not be fixed for a UE, network slice, bearer or IP flow and may change depending on factors including the type of traffic, the mobility of the UE, the cost of network resources, need for IP address preservation, and network conditions. For example, if the mobility of a UE increases or is anticipated to increase, an associated L-GW may be moved further from the eNBs such that movement of the UE between eNBs may be more efficiently handled.

Furthermore, the above described functionality such as L-GW mobility, flow table updating and IP address replacement for example may be implemented by any appropriate mobile network entities or implemented in a distributed manner across the mobile operator network.

The invention claimed is:

1. A method of operating a mobile communications network by a routing controller arranged to communicate data packets between a terminal and a packet data network via one or more routers, wherein the one or more routers include routing information for routing data packets, the method comprising:
   establishing a data packet pathway for communicating data packets between a first Internet Protocol (IP) address associated with the terminal and a second IP address associated with the packet data network, the data packet pathway including a first local gateway, wherein a local gateway is a point within the mobile communications network through which all data packets communicated over the data packet pathway from the second IP address to the first IP address pass and the first local gateway allocates the first IP address to the terminal from a pool of IP addresses belonging to the first local gateway;
   communicating one or more data packets between the first IP address and the second IP address via the data packet pathway including the first local gateway;
   selecting a second local gateway based on a position of the terminal;
   updating the routing information of at least one of the routers by replacing the first local gateway with the second local gateway in the data packet pathway while maintaining the first IP address allocated by the first local gateway to the terminal; and
   communicating one or more data packets between the first IP address and the second IP address via the data packet pathway including the second local gateway.

2. The method of claim 1, wherein a data packet routing between the first local gateway or the second local gateway and the packet data network is based on IP address replacement routing or an IP address based routing.

3. The method of claim 1, wherein the updating of the routing information includes:
   determining, by the routing controller, routing information associated with the first IP address; and
   updating the routing information of the at least one of the routers based on the determined routing information.

4. The method of claim 3, wherein, in a case that an IP address replacement is used, the updating of the routing information includes updating a replacement IP address in the at least one of the routers.

5. The method of claim 3, wherein, in a case that an IP address based routing is used, the updating of the routing information includes updating a routing table of the at least one of the routers.

6. The method of claim 1, wherein the selecting of the second local gateway comprises:
   selecting the second local gateway based on at least one of the position of the terminal, a mobility of the terminal, a type of data included in the data packets, a condition of the mobile communications network, an optimal routing between the terminal and the packet data network, and a user plane delay requirement.

7. The method of claim 1, wherein the data packet pathway includes one or more bearers.

8. The method of claim 1, wherein the data packet pathway includes one or more IP flows.

9. The method of claim 1, wherein the communicating via the data packet pathway includes routing data packets between the first IP address and the first local gateway or the second local gateway in accordance with an IP tunneling, an IP address replacement, or an IP address based routing.

10. The method of claim 1, wherein the first local gateway or the second local gateway act as an IP anchor for the terminal.

11. The method of claim 1, wherein the establishing of the data packet pathway includes selecting the first local gateway based on at least one of a position of the terminal, a mobility of the terminal, a type of data included in the data packets, a condition of the mobile communications network, an optimal routing between the terminal and the packet data network, and a user plane delay requirement.

12. The method of claim 1, wherein the mobile communications network includes one or more base stations arranged to communicate data packets to the terminal via a wireless access interface and one or more entry routers arranged to communicate packets between the mobile communications network and packet data network, and a local gateway located at any one of a base station, an entry router, and a router between the one or more base stations and the one or more entry routers.

13. A routing controller included in a mobile communications network comprising a terminal, one or more routers for routing data packets between a data packet network and the terminal, and a local gateway, wherein the local gateway is a point within the mobile communications network through which all data packets communicated from the packet data network to the terminal pass, the routing controller is configured to:
   establish a data packet pathway for communicating data packets between a first Internet Protocol (IP) address associated with the terminal and a second IP address associated with the packet data network, the data packet pathway including a first local gateway, wherein the first local gateway allocates the first IP address to the terminal from a pool of IP addresses belonging to the first local gateway, communicate one or more data packets between the first IP address and the second IP address via the data packet pathway including the first local gateway, select a second local gateway; based on a position of the terminal, update the routing information of at least one of the routers by replacing the first local gateway with the second local gateway in the data packet pathway while maintaining the first IP address allocated by the first local gateway to the terminal, and communicate one or more data packets between the first IP address and the second IP address via the data packet pathway including the second local gateway.

* * * * *